US012777183B2

(12) United States Patent
Lai et al.

(10) Patent No.: US 12,777,183 B2
(45) Date of Patent: Oct. 27, 2026

(54) BILATERAL TEMPLATE WITH MULTIPASS DECODER SIDE MOTION VECTOR REFINEMENT

(71) Applicant: MEDIATEK INC., Hsinchu City (TW)

(72) Inventors: Chen-Yen Lai, Hsinchu City (TW); Hong-Hui Chen, Hsinchu City (TW); Ching-Yeh Chen, Hsinchu City (TW); Chun-Chia Chen, Hsinchu City (TW); Chih-Wei Hsu, Hsinchu City (TW); Tzu-Der Chuang, Hsinchu City (TW); Yu-Wen Huang, Hsinchu City (TW); Yi-Wen Chen, San Jose, CA (US)

(73) Assignee: MEDIATEK INC., Hsinchu City (TW)

( * ) Notice: Subject to any disclaimer, the term of this patent is extended or adjusted under 35 U.S.C. 154(b) by 34 days.

(21) Appl. No.: 18/849,151

(22) PCT Filed: Mar. 30, 2023

(86) PCT No.: PCT/CN2023/085224
§ 371 (c)(1),
(2) Date: Sep. 20, 2024

(87) PCT Pub. No.: WO2023/186040
PCT Pub. Date: Oct. 5, 2023

(65) Prior Publication Data

US 2025/0211779 A1 Jun. 26, 2025

Related U.S. Application Data

(60) Provisional application No. 63/378,376, filed on Oct. 5, 2022, provisional application No. 63/325,753, filed on Mar. 31, 2022.

(51) Int. Cl.
*H04N 19/513* (2014.01)
*H04N 19/105* (2014.01)
(Continued)

(52) U.S. Cl.
CPC ......... *H04N 19/521* (2014.11); *H04N 19/105* (2014.11); *H04N 19/139* (2014.11); *H04N 19/176* (2014.11); *H04N 19/70* (2014.11)

(58) Field of Classification Search
CPC .... H04N 19/176; H04N 19/105; H04N 19/70; H04N 19/577; H04N 19/513
See application file for complete search history.

(56) References Cited

U.S. PATENT DOCUMENTS 8,290,048 B2 * 10/2012 Kondo .................. H04N 19/61
375/240.16
9,124,896 B2 * 9/2015 Kondo ................ H04N 19/593
(Continued)

FOREIGN PATENT DOCUMENTS

| | | |
|---|---|---|
| WO | 2020009898 A1 | 1/2020 |
| WO | 2020177665 A1 | 9/2020 |
| WO | 2020180685 A1 | 9/2020 |

OTHER PUBLICATIONS

International Search Report and Written Opinion dated Jun. 14, 2023, issued in application No. PCT/CN2023/085224.
(Continued)

*Primary Examiner* — Daniel Chang
(74) *Attorney, Agent, or Firm* — McClure, Qualey & Rodack, LLP

(57) ABSTRACT

A video coder using bilateral template to perform decoder-side motion vector refinement is provided. The video coder receives receiving data for a block of pixels to be encoded or decoded as a current block of a current picture of a video. The current block is associated with a first motion vector referring a first initial predictor in a first reference picture and a second motion vector referring a second initial predictor in a second reference picture. The video coder generates a bilateral template based on the first initial predictor and the second initial predictor. The video coder refines the
(Continued)

first motion vector to minimize a first cost between the bilateral template and a predictor referenced by the refined first motion vector. The video coder refines the second motion vector to minimize a second cost between the bilateral template and a predictor referenced by the refined second motion vector.

13 Claims, 14 Drawing Sheets

(51) Int. Cl.

| | |
|---|---|
| ***H04N 19/139*** | (2014.01) |
| ***H04N 19/176*** | (2014.01) |
| ***H04N 19/70*** | (2014.01) |

(56) References Cited

U.S. PATENT DOCUMENTS

| | | | | |
|---|---|---|---|---|
| 9,124,897 | B2 * | 9/2015 | Kondo | H04N 19/51 |
| 9,161,050 | B2 * | 10/2015 | Kondo | A61B 5/7207 |
| 9,451,278 | B2 * | 9/2016 | Kondo | H04N 19/533 |
| 11,563,948 | B2 * | 1/2023 | Sethuraman | H04N 19/137 |
| 2015/0055713 | A1 * | 2/2015 | Kondo | H04N 19/137 375/240.16 |
| 2015/0063458 | A1 * | 3/2015 | Kondo | A61B 5/022 375/240.16 |
| 2015/0373363 | A1 * | 12/2015 | Kondo | H04N 19/184 375/240.16 |
| 2015/0373364 | A1 * | 12/2015 | Kondo | H04N 19/52 375/240.16 |
| 2016/0360227 | A1 * | 12/2016 | Kondo | H04N 19/537 |
| 2016/0360228 | A1 * | 12/2016 | Kondo | A61B 5/022 |
| 2018/0007383 | A1 * | 1/2018 | Kondo | H04N 19/533 |
| 2018/0192071 | A1 * | 7/2018 | Chuang | H04N 19/577 |
| 2018/0199034 | A1 * | 7/2018 | Nam | H04N 19/82 |
| 2021/0021841 | A1 * | 1/2021 | Xu | H04N 19/157 |

OTHER PUBLICATIONS

Chinese language office action dated Mar. 29, 2024, issued in application No. TW 112112581.

* cited by examiner

BILATERAL TEMPLATE WITH MULTIPASS DECODER SIDE MOTION VECTOR REFINEMENT

CROSS REFERENCE TO RELATED PATENT APPLICATION(S)

The present disclosure is part of a non-provisional application that claims the priority benefit of U.S. Provisional Patent Application No. 63/325,753 filed on 31 Mar. 2022 and U.S. Provisional Patent Application No. 63/378,376 filed on 5 Oct. 2022. Contents of above-listed applications are herein incorporated by reference.

TECHNICAL FIELD

The present disclosure relates generally to video coding. In particular, the present disclosure relates to decoder side motion vector refinement (DMVR).

BACKGROUND

Unless otherwise indicated herein, approaches described in this section are not prior art to the claims listed below and are not admitted as prior art by inclusion in this section.

High-Efficiency Video Coding (HEVC) is an international video coding standard developed by the Joint Collaborative Team on Video Coding (JCT-VC). HEVC is based on the hybrid block-based motion-compensated DCT-like transform coding architecture. The basic unit for compression, termed coding unit (CU), is a 2N×2N square block of pixels, and each CU can be recursively split into four smaller CUs until the predefined minimum size is reached. Each CU contains one or multiple prediction units (PUs).

Versatile video coding (VVC) is the latest international video coding standard developed by the Joint Video Expert Team (JVET) of ITU-T SG16 WP3 and ISO/IEC JTC1/SC29/WG11. The input video signal is predicted from the reconstructed signal, which is derived from the coded picture regions. The prediction residual signal is processed by a block transform. The transform coefficients are quantized and entropy coded together with other side information in the bitstream. The reconstructed signal is generated from the prediction signal and the reconstructed residual signal after inverse transform on the de-quantized transform coefficients. The reconstructed signal is further processed by in-loop filtering for removing coding artifacts. The decoded pictures are stored in the frame buffer for predicting the future pictures in the input video signal.

In VVC, a coded picture is partitioned into non-overlapped square block regions represented by the associated coding tree units (CTUs). A coded picture can be represented by a collection of slices, each comprising an integer number of CTUs. The individual CTUs in a slice are processed in raster-scan order. A bi-predictive (B) slice may be decoded using intra prediction or inter prediction with at most two motion vectors and reference indices to predict the sample values of each block. A predictive (P) slice is decoded using intra prediction or inter prediction with at most one motion vector and reference index to predict the sample values of each block. An intra (I) slice is decoded using intra prediction only.

For each inter-predicted CU, motion parameters consisting of motion vectors, reference picture indices and reference picture list usage index, and additional information are used for inter-predicted sample generation. The motion parameter can be signalled in an explicit or implicit manner. When a CU is coded with skip mode, the CU is associated with one PU and has no significant residual coefficients, no coded motion vector delta or reference picture index. A merge mode is specified whereby the motion parameters for the current CU are obtained from neighbouring CUs, including spatial and temporal candidates, and additional schedules introduced in VVC. The merge mode can be applied to any inter-predicted CU. The alternative to merge mode is the explicit transmission of motion parameters, where motion vector, corresponding reference picture index for each reference picture list and reference picture list usage flag and other needed information are signalled explicitly per each CU.

SUMMARY

The following summary is illustrative only and is not intended to be limiting in any way. That is, the following summary is provided to introduce concepts, highlights, benefits and advantages of the novel and non-obvious techniques described herein. Select and not all implementations are further described below in the detailed description. Thus, the following summary is not intended to identify essential features of the claimed subject matter, nor is it intended for use in determining the scope of the claimed subject matter.

Some embodiments provide a video coder that uses bilateral template to perform decoder-side motion vector refinement. The video coder receives receiving data for a block of pixels to be encoded or decoded as a current block of a current picture of a video. The current block is associated with a first motion vector referring a first initial predictor in a first reference picture and a second motion vector referring a second initial predictor in a second reference picture. The first and second motion vectors may be of a bi-prediction merge candidate. When the first motion vector is a uni-prediction candidate, the second motion vector may be generated by mirroring the first motion vector in an opposite direction.

The video coder generates a bilateral template based on the first initial predictor and the second initial predictor. The video coder refines the first motion vector to minimize a first cost between the bilateral template and a predictor referenced by the refined first motion vector. The video coder refines the second motion vector to minimize a second cost between the bilateral template and a predictor referenced by the refined second motion vector. The video coder encodes or decodes the current block by using the refined first and second motion vectors to reconstruct the current block.

In some embodiments, the video coder also signals or receives a first syntax element that indicates whether to refine the first or second motion vectors by using the generated bilateral template or by performing bilateral matching based on the first and second initial predictors. In some embodiments, the video coder signals or receives a second syntax element that indicates whether to refine the first motion vector or to refine the second motion vector.

The video coder may derive the bilateral template as a weighted sum of the first initial predictor and the second initial predictor. In some embodiments, the weights respectively applied to the first and second initial predictors are determined based on slice quantization parameter values of the first and second initial predictors. In some embodiments, the weights respectively applied to the first and second initial predictors are determined based on picture order count (POC) distances of the first and second reference pictures from the current picture. In some embodiments, the weights respectively applied to the first and second initial predictors are determined according to a Bi-prediction with CU-level weights (BCW) index that is signaled for the current block.

In some embodiments, the video coder refines the bilateral template by using a linear model that is generated based on extended regions (e.g., L-shaped above and left regions) of the first initial predictor, the second initial predictor, and the current block. In some embodiments, the video coder refines the first and second initial predictors based on a linear model that is generated based on extended regions of the first initial predictor, the second initial predictor, and the current block, then generates the bilateral template based on the refined first and second initial predictors.

In some embodiments, the video coder refines the first and second motion vectors in multiple passes. The video coder may further refine the first and second motion vectors for each sub-block of a plurality of sub-blocks of the current block in a second refinement pass. The video coder may further refine the first and second motion vectors by applying bi-directional optical flow (BDOF) in a third refinement pass. In some embodiments, during the second refinement pass, the first and second motion vectors are refined by minimizing a cost between a predictor referenced by the refined first motion vector and a predictor referenced by the refined second motion vector (i.e., bilateral matching.) In some embodiments, when the bilateral template is used to refine the first and second motion vectors, second and third refinement passes are disabled.

BRIEF DESCRIPTION OF THE DRAWINGS

The accompanying drawings are included to provide a further understanding of the present disclosure, and are incorporated in and constitute a part of the present disclosure. The drawings illustrate implementations of the present disclosure and, together with the description, serve to explain the principles of the present disclosure. It is appreciable that the drawings are not necessarily in scale as some components may be shown to be out of proportion than the size in actual implementation in order to clearly illustrate the concept of the present disclosure.

DETAILED DESCRIPTION

In the following detailed description, numerous specific details are set forth by way of examples in order to provide a thorough understanding of the relevant teachings. Any variations, derivatives and/or extensions based on teachings described herein are within the protective scope of the present disclosure. In some instances, well-known methods, procedures, components, and/or circuitry pertaining to one or more example implementations disclosed herein may be described at a relatively high level without detail, in order to avoid unnecessarily obscuring aspects of teachings of the present disclosure.

I. Bilateral Template

Figure 1:
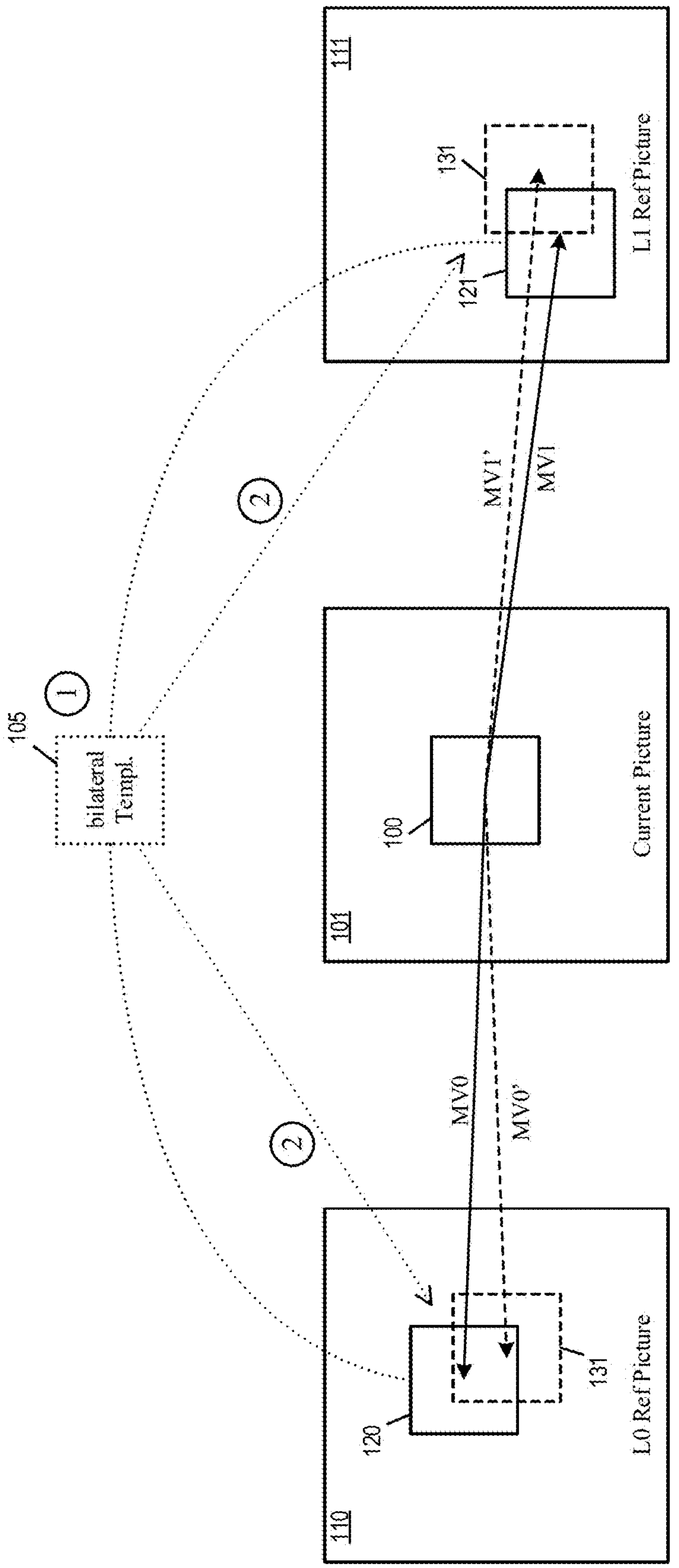
FIG. 1 conceptually illustrates a decoder side motion vector refinement (DMVR) operation based on a bilateral template.

For some embodiments, a bilateral template (or bi-template) is generated as the weighted combination of the two reference blocks (or predictors), that are referenced by the initial MV0 of list0 (or L0) and MV1 of list1 (or L1) respectively. FIG. 1 conceptually illustrates a decoder side motion vector refinement (DMVR) operation based on a bilateral template. The figure illustrates the bilateral-template-based DMVR operation for a current block 100 in two steps:

Step 1, the video coder generates a bilateral template 105 based on initial reference blocks 120 and 121, which are referenced by the initial bi-prediction motion vectors MV0 and MV1 in reference pictures 110 and 111, respectively. The bilateral template 105 may be a weighted combination of the initial reference blocks 120 and 121.

Step 2, the video coder performs template matching based on the generated bilateral template 105 to refine the MV0 and MV1. Specifically, the video coder searches around the reference block 120 in the reference picture 110 for a better match of the bilateral template 105, and also searches around the reference block 121 in the reference picture 111 for a better match of the bilateral template 105. The search identified an updated reference block 130 (referred by the refined MV0') and an updated reference block 131 (referred by the refined MV1'.) The template matching operation based on bilateral template includes calculating cost measures between the generated bilateral template 105 and sample regions around the initial reference blocks 120 and 121 in the reference pictures. For each of the two reference pictures 110 and 111, the MV that yields the minimum template cost is considered as the updated (refined) MV of that list to replace the original one. Finally, the two refined MVs, i.e., MV0' and MV1', are used for regular bi-prediction in place of the initial MVs, i.e., MV0 and MV1. As it is commonly used in block-matching motion estimation, the sum of absolute differences (SAD) is utilized as cost measure.

In some embodiments, DMVR is applied for merge mode of bi-prediction with one merge candidate from the reference picture in the past (L0) and the other merge candidate from reference picture in the future (L1), without the transmission of additional syntax element.

II. Multi-Pass DMVR

In some embodiments, a multi-pass decoder-side motion vector refinement (MP-DMVR) method is applied in regular merge mode if the selected merge candidate meets the DMVR conditions. In the first pass, bilateral matching (BM) is applied to the coding block. In the second pass, BM is applied to each 16×16 subblock within the coding block. In the third pass, MV in each 8×8 subblock is refined by applying bi-directional optical flow (BDOF). The BM refines a pair of motion vectors MV0 and MV1 under the constrain that motion vector difference MVD0 (i.e., MV0'-MV0) is just the opposite sign of motion vector difference MVD1 (i.e., MV1'−MV1).

Figure 2:
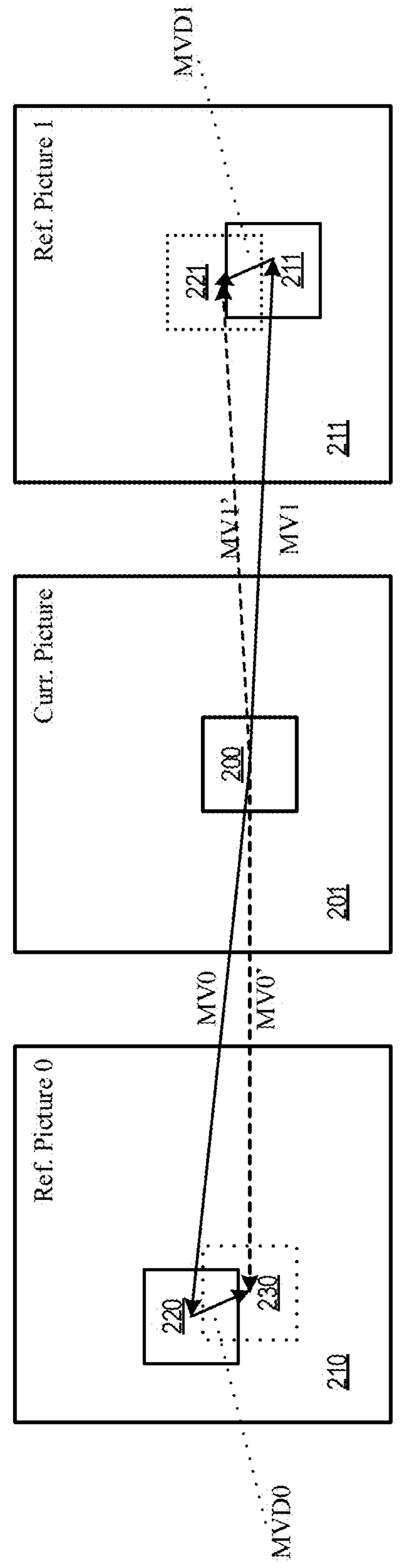
FIG. 2 conceptually illustrates refinement of a prediction candidate (e.g., merge candidate) by bilateral matching (BM).

FIG. 2 conceptually illustrates refinement of a prediction candidate (e.g., merge candidate) by bilateral matching (BM). MV0 is an initial motion vector or a prediction candidate, MV1 is the mirror of MV0. MV0 references an initial reference block 220 in reference picture 210. MV1 references an initial reference block 221 in a reference picture 211. The figure shows MV0 and MV1 being refined to form MV0' and MV1', which reference updated reference blocks 230 and 231, respectively. The refinement is performed according to bilateral matching, such that the refined motion vector pair MV0' and MV1' has better bilateral matching cost than the initial motion vector pair MV0 and MV1. MV0'−MV0 (i.e., MVD0) and MV1'−MV1 (i.e., MVD1) are constrained to be equal in magnitude but opposite in direction. In some embodiments, the bilateral matching cost of a pair of mirrored motion vectors (e.g., MV0 and MV1) is calculated based on the difference between the two reference blocks referred by the mirrored motion vectors (e.g., difference between the reference blocks 210 and 211).

III. Adaptive MP-DMVR

Adaptive decoder side motion vector refinement (Adaptive DMVR) method refines MV in only one of two directions of the bi-prediction (L0 and L1), for merge candidates that meet the DMVR conditions. Specifically, for a first unidirectional bilateral DMVR mode, L0 MV is modified or refined while L1 MV is fixed (so MVD1 is zero); for a second unidirectional DMVR, L1 MV is modified or refined while L0 MV is fixed (so MVD0 is zero).

The adaptive multi-pass DMVR process is applied for the selected merge candidate to refine the motion vectors, with either MVD0 or MVD1 being zero in the first pass of MP-DMVR (i.e., coding block or PU level DMVR.)

Figure 3A:
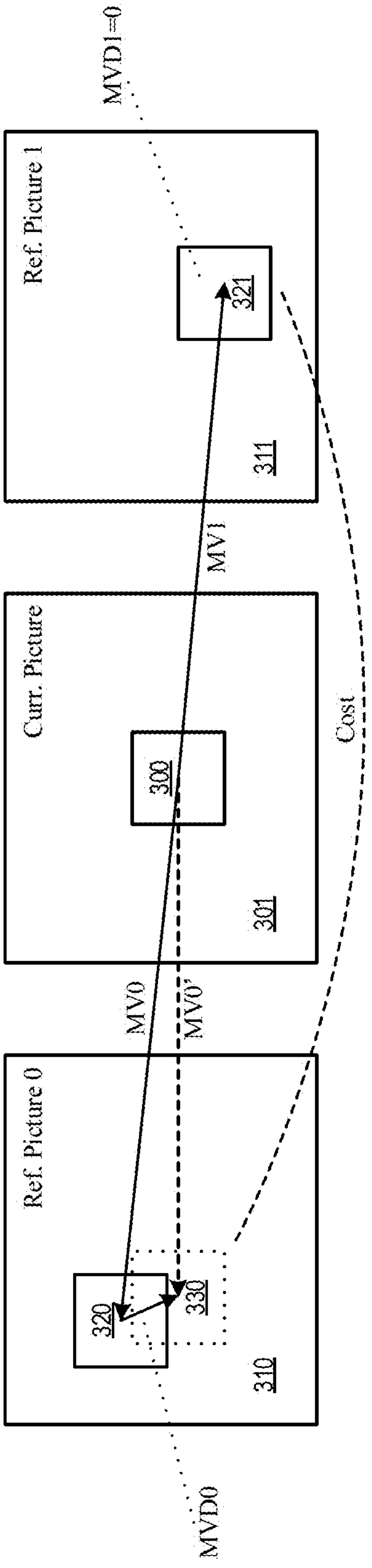
FIGS. 3A-B conceptually illustrate refining bi-prediction MVs under adaptive DMVR.
Figure 3B:
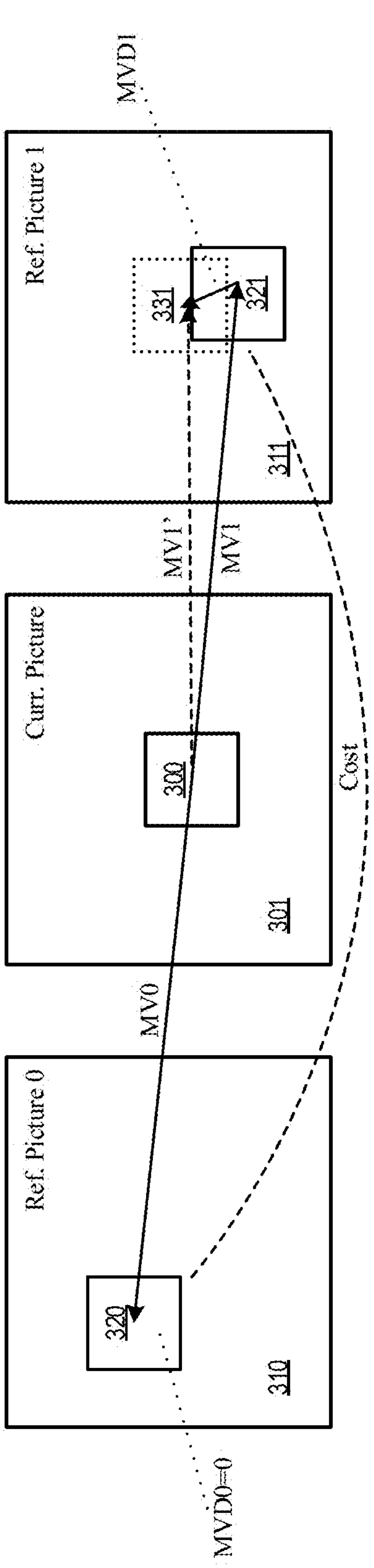

FIGS. 3A-B conceptually illustrate refining bi-prediction MVs under adaptive DMVR. The figures illustrate a current block 300 having initial bi-prediction MVs in L0 and L1 directions (MV0 and MV1). MV0 references an initial reference block 320 and MV1 references an initial reference block 321. Under adaptive DMVR, MV0 and MV1 are refined separately based on minimizing a cost that is calculated based on the difference between the reference blocks referred by MV0 and MV1.

FIG. 3A illustrates the first unidirectional bilateral DMVR modes in which only L0 MV is refined while L1 MV is fixed. As illustrated, MV1 remain fixed to reference the reference block 321, while MV0 is refined/updated to MV0' to refer to an updated reference block 330 that is a better bilateral match for the fixed L1 reference block 321. FIG. 3B illustrates the second unidirectional bilateral DMVR mode in which only L1 MV is refined while L0 MV is fixed. As illustrated, MV0 remain fixed to reference the reference block 320, while MV1 is refined/updated to MV1' to refer to an updated reference block 331 that is a better bilateral match for the fixed L0 reference block 320.

Similar to the regular merge mode DMVR, merge candidates for the two unidirectional bilateral DMVR modes are derived from the spatial neighboring coded blocks, TMVPs, non-adjacent blocks, HMVPs, and pair-wise candidate. The difference is that only merge candidates that meet DMVR conditions are added into the candidate list. The same merge candidate list is used by the two unidirectional bilateral DMVR modes, and their corresponding merge indices is coded as in regular merge mode. There are two syntax elements to indicate the adaptive MP-DMVR mode: bmMergeFlag and bmDirFlag. The syntax element bmMergeFlag is used to indicate the on-off of this type of prediction (refine MV only in one direction, or adaptive MP-DMVR). When bmMergeFlag is on, the syntax element bmDirFlag is used to indicate the refined MV direction. For example, when bmDirFlag is equal to 0, the refined MV is from List0; when bmDirFlag is equal to 1, the refined MV is from List 1. As shown in the following syntax table:

```
bm_merge_flag
if (bm_merge_flag)
  bm_dir_flag
```

After decoding bm_merge_flag and bm_dir_flag, a variable bmDir can be decided. For example, if bm_merge_flag is equal to 1, bm_dir_flag is equal to 0, bmDir will be set as 1 to indicate that the adaptive MP-DMVR only refine the MV in List0 (or MV0). For another example, if bm_merge_flag is equal to 1, bm_dir_flag is equal to 1, bmDir will be set as 2 to indicate that the adaptive MP-DMVR only refine the MV in List1 (or MV1).

IV. Bilateral Template with MP-DMVR

Some embodiments of the disclosure provide a method that applies bilateral template cost with MP-DMVR. The video coder generates a bilateral template described above in Section I. The generated bilateral template is then used for calculating the cost in a manner similar to adaptive DMVR described above in Section III (refining the L0 MV while fixing L1 MV, or refining L1 MV while fixing L0 MV.) When refining the L0 MV, the cost is calculated based on the difference between the L0 predictor and the bilateral template. When refining L1 MV, the cost is calculated based on the difference between the L1 predictor and the bilateral template. For each of the two reference lists, the MV that yields the minimum template cost is considered as the updated MV of that list to replace the original one. The refinement of the L0 and L1 MVs are independent of each other.

Figure 4A:
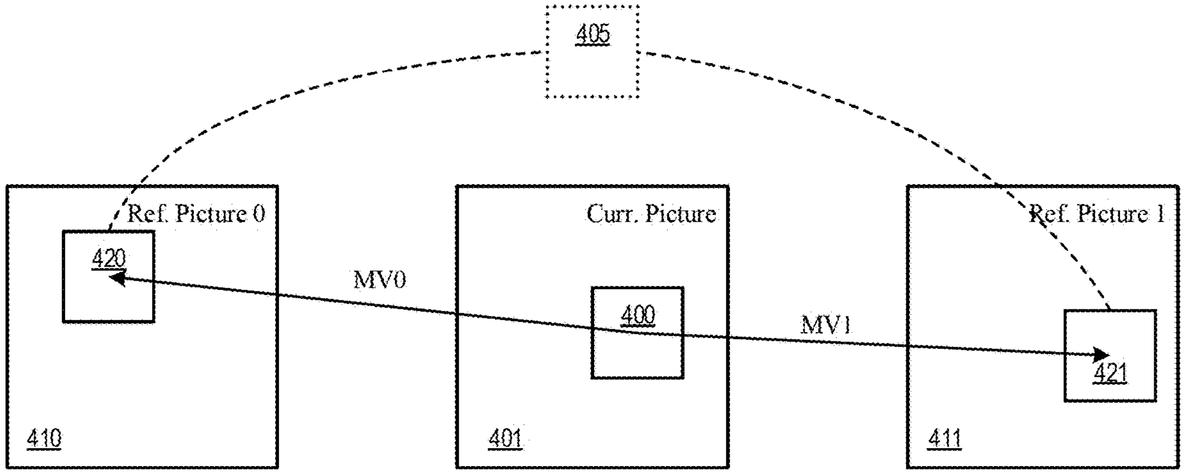
FIG. 4A-C conceptually illustrate using bilateral template to determine the cost when performing MP-DMVR for a current block.
Figure 4B:
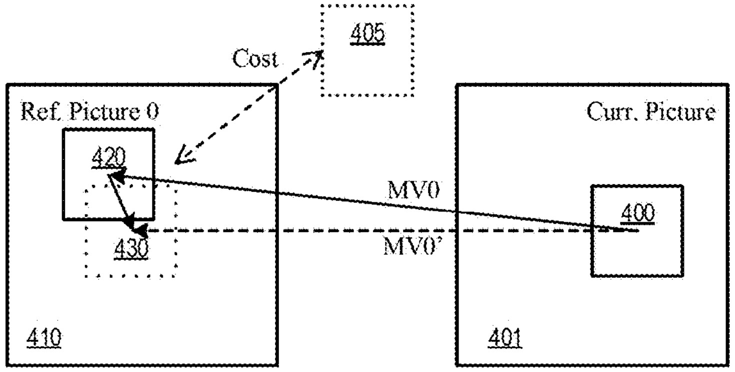
Figure 4C:
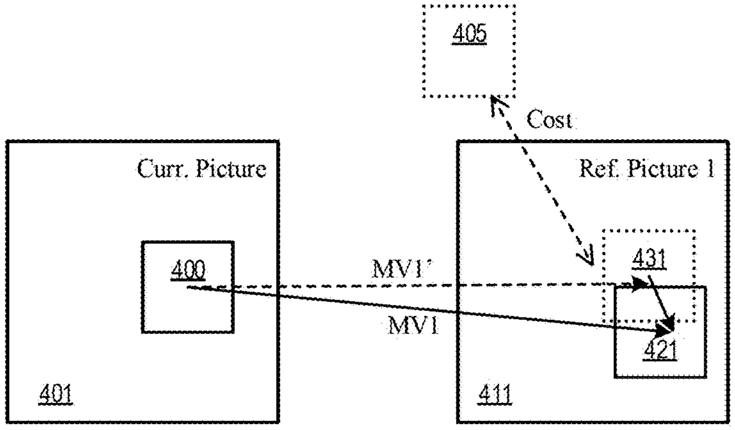

FIG. 4A-C conceptually illustrate using bilateral template to determine the cost when performing MP-DMVR for a current block 400. The current block has a pair of initial MVs (MV0 and MV1) for bi-prediction that are to be refined by MP-DMVR. For each MV (whether MV0 or MV1), the video coder calculates the template cost based on the difference between the generated bilateral template and the sample region around the initial reference block in the reference picture.

FIG. 4A illustrates the video coder generating a bilateral template 405 as the weighted combination of the two (initial) reference blocks 420 and 421 that are referred by MV0 and MV1. The reference block 420 is a predictor from a L0 reference picture 410 and the reference block 421 is a predictor from a L1 reference picture 411.

FIG. 4B illustrates refining the MV0 into MV0' based on the bilateral template 405. The generated bilateral template 405 and the sample region (in search of updated L0 predictor 430 and MV0', around the initial reference block 420 of initial MV0) are used to calculate the template cost. The generated bilateral template 405 is treated like a template from list1 (i.e., the template 405 is used in place of the initial L1 predictor 421).

FIG. 4C illustrates refining the MV1 into MV1' based on the bilateral template 405. The generated bilateral template 405 and the sample region (in search of updated L1 predictor 431 and MV1', around the initial reference block 421 of initial MV1) are used to calculate the template cost. The generated bilateral template 405 is treated like a template from list0 (i.e., the template 405 is used in place of the initial L0 predictor 420). The video coder may perform further MP-DMVR passes to refine MV0' and MV1'. The two finally refined MVs (MV0' and MV1') are then used for regular bi-prediction and coding of the current block 400.

A. Explicit Signaling

In some embodiments, bilateral template with MP-DMVR is used as an adaptive MP-DMVR mode with additional flag signaling. In some embodiments, bilateral template can be used in conjunction with adaptive MP-DMVR as one additional mode. An additional flag bm_bi_template_flag may be signaled to indicate the enabling or disabling of this mode. As shown in the following table:

```
bm_merge_flag
if (bm_merge_flag)
   bm_bi_template_flag
   if (bm_bi_template_flag == false)
      bm_dir_flag
```

In some other embodiments, syntax element bm_mode_index is used. Specifically, bm_mode_index being equal to 0 or 1 indicates a unidirectional BDMVR mode (e.g., 0 indicates unidirectional BDMVR mode for L0 direction, 1 indicates unidirectional BDMVR mode for L1 direction), and bm_mode_index being equal to 2 indicates bilateral template DMVR.

```
bm_merge_flag
if (bm_merge_flag)
   bm_mode_index
```

In some embodiments, in adaptive MP-DMVR, when bmDir is equal to 1, MV refinement is applied to list0 only; when bmDir is equal to 2, MV refinement is applied to list1 only (e.g., bm_dir_flag to 1); when bmDir is equal to 3, bilateral template is used to refine MVs in both list0 and list1. For example, when bmDir is equal to 3 (e.g., bm_bi_template_flag to 1), bilateral template is used to refine MVs in list0 and list1 in pass 1 of MP-DMVR. (In passes 2 and 3, subblock bilateral matching and BDOF algorithm are applied respectively to derive motion refinement.) In some embodiments, when bmDir is equal to 3, bilateral template is used to refine L0 and L1 MVs in MP-DMVR pass 2. In pass 2, subblock-based bilateral template is performed such that bilateral template is generated for each subblock. (In passes 1 and 3, bilateral matching and BDOF algorithm are applied respectively to derive motion refinement). In some embodiments, when bmDir is equal to 3, bilateral template is used to refine MVs in list0 and list1 in both passes 1 and 2 of MP-DMVR. (In pass 3, BDOF algorithm is applied to derive motion refinement.)

In some embodiments, if bilateral template is used in MP-DMVR, one or more passes of MP-DMVR can be skipped. For example, if bilateral template is applied in pass 1, the subblock-based bilateral matching of pass 2 can be skipped. For another example, if bilateral template is applied in pass 1, the subblock-based bilateral matching of pass 2 and the BDOF-related refinement derivation of pass 3 can be skipped. For another example, if bilateral template is applied in pass 2, the block-based bilateral matching of pass 1 can be skipped.

B. Implicit Signaling of MP-DMVR

In some embodiments, bilateral template with MP-DMVR is used as one adaptive MP-DMVR mode without additional flag signaling. As shown in the following syntax table:

```
bm_merge_flag
if (bm_merge_flag)
   bm_dir_flag
```

After decoding bm_merge_flag and bm_dir_flag, the variable bmDir can be determined. For example, if bm_merge_flag is equal to 1 and bm_dir_flag is equal to 0, bmDir will be set as 1, and bmDir is used to indicate that adaptive MP-DMVR is refining a MV in only list0 or only list1. For another example, if bm_merge_flag is equal to 1 and bm_dir_flag is equal to 1, bmDir will be set as 2 to indicate that bilateral template is used to refine MVs in both list0 and list1. The MV refinement will be applied to list0 or list1 when bmDir is equal to 1.

In some embodiments, whether to perform MV refinement on list0 or list1 is decided based on the cost of block-based bilateral matching (original MP-DMVR pass 1), or the cost of subblock-based bilateral matching, or the cost of L-neighboring template matching, or some other statistical analysis results. For example, the difference of intensity between the current block and the template of the initial MV0 in list0 and the initial MV1 in list1 may be used to decide whether MV refinement is to be performed on list0 or list1. The list (list0 or list1) providing the template with the smaller cost will be selected so the MV from the selected list is refined. The MV of the other direction/list is not refined. This selection may be applicable to only MP-DMVR pass 1; or applicable to both passes 1 and 2 of MP-DMVR; or applicable for the entire MP-DMVR process. In some embodiments, if bilateral template is used (e.g., bmDir is equal to 2) in MP-DMVR, one or more passes of MP-DMVR may be skipped.

C. Dedicated Merge Candidate List

In some embodiments, bilateral template with MP-DMVR as one adaptive MP-DMVR mode is used with/without additional flag signaling. Specifically, a dedicated merge candidate list is derived.

Every merge candidate in this dedicated merge candidate list can be refined using MP-DMVR, adaptive MP-DMVR, or bilateral template. The signaling methods for bilateral template described above in Sections IV.A and Section IV.B can be applied for each candidate of the dedicated merge candidate list with or without additional flag signaling.

D. Bilateral Template for Uni-Prediction Candidates

In some embodiments, bilateral template is applied to refine uni-prediction candidates. Specifically, a MV needed for deriving a bilateral template can be derived by MV mirroring. For example, if the direction of a uni-prediction candidate is from list0 (initial MV0), a MV1 in list1 can be derived by mirroring (mirror MV). After applying MV mirroring, the MV of a uni-prediction candidate can be further refined. The refining includes applying MP-DMVR or applying bilateral template MP-DMVR. The bilateral template can be generated by the initial MV0 from list0 and the mirrored MV1 from list1. The generated bilateral template and the sample region (around the initial reference block of initial MV0 of list0) are used to calculate the cost for bilateral template. The MV that yields the minimum template cost is considered as the updated MV of list0 to replace the original one. The same mechanism can be applied for list1 as well.

E. Refine Template with Derived Model

The bilateral template is generated as the weighted combination of the two reference blocks from the initial MV0 of list0 and the initial MV1 of list1. In some embodiments, the generated bilateral template can be further refined by a linear model that is derived based on extended regions of the bilateral template and of the current block. The linear model used to refine the bilateral template is based on regions extended from the motion compensation region of the L0 and L1 reference blocks. In some embodiments, this extended (e.g., L-shaped) region may include i above lines and j left lines of the L0/L1 reference block (i and j can be any values larger than or equal to 0; i and j can be equal or non-equal.)

An extended bilateral template is then generated based on weighted sums of the extended reference block of L0 and the extended reference block of L1. The samples in the extended region (ex. L-shape region) of the bilateral template and the corresponding neighboring reconstructed samples of current reconstructed block are used to derive a linear model. The bilateral template without extended region is further refined by the linear model. The refined bilateral template can be used for any bilateral template with DMVR methods mentioned above.

Figure 5:
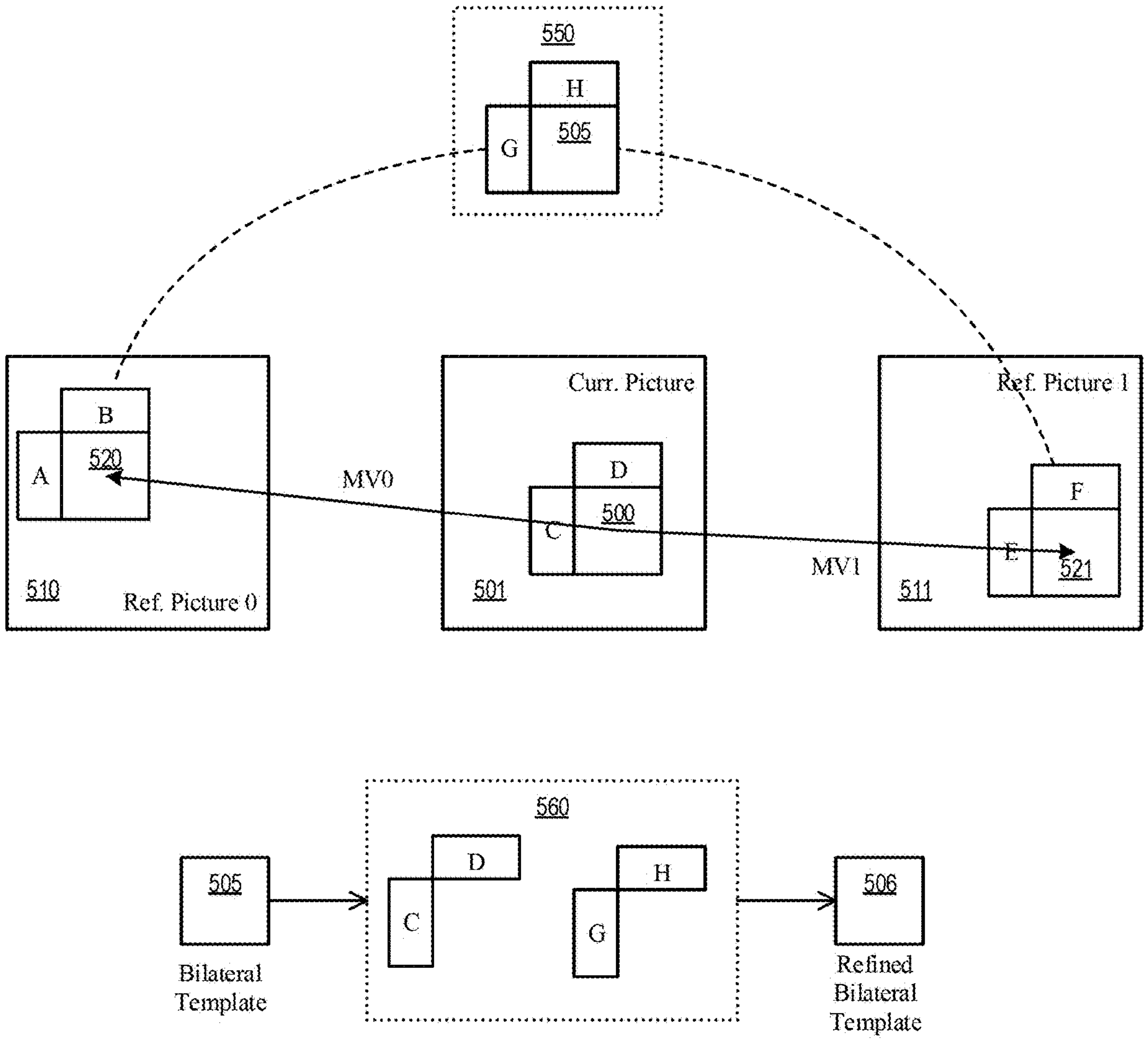
FIG. 5 illustrates refining a bilateral template based on a linear model that is derived based on the extended regions of the current block and of the bilateral template.

FIG. 5 illustrates refining a bilateral template based on a linear model that is derived based on the extended regions of the current block and of the bilateral template. As illustrates, a current block 500 has an initial L0 reference block 520 (referred by MV0) and an initial L1 reference block 521 (referred by MV1). The L0 reference block 520 has extended regions A and B. The current block 500 has extended regions C and D. The L1 reference block 521 has extended regions E and F. The video coder generates an extended bilateral template 550 by weighted sum from the extended L0 reference block (reference block 520 with A and B) and extended L1 reference block (reference block 521 with E and F). The extended bilateral template 550 includes a bilateral template 505 with extended regions H and G. A linear model 560 is generated based on the extended regions of the current block (C and D) and the extended regions of the bilateral template (H+G). The linear model 560 can then be applied to refine the bilateral template 505 (without its extended region) into a refined bilateral template 506 for use by any bilateral template with DMVR methods described above.

In some embodiments, the samples in the extended region (ex. L-shape region above and left) of L0 reference (prediction) block and the corresponding neighboring samples of current block are used to derive a L0 linear model (P-model). The samples in the extended region (ex. L-shape region) of L1 reference block and the corresponding neighboring samples of current block are used to derive a L1 linear model (Q-model). The P-model is used to refine the L0 reference block to generate a refined refL0Blk and the Q-model is used to refine the L1 reference block to generate a refined refL1Blk. A bilateral template is generated by weighting the sum of the refined refL0Blk and the refined refL1Blk. The bilateral template can be used for any bilateral template with DMVR method mentioned in the above.

Figure 6:
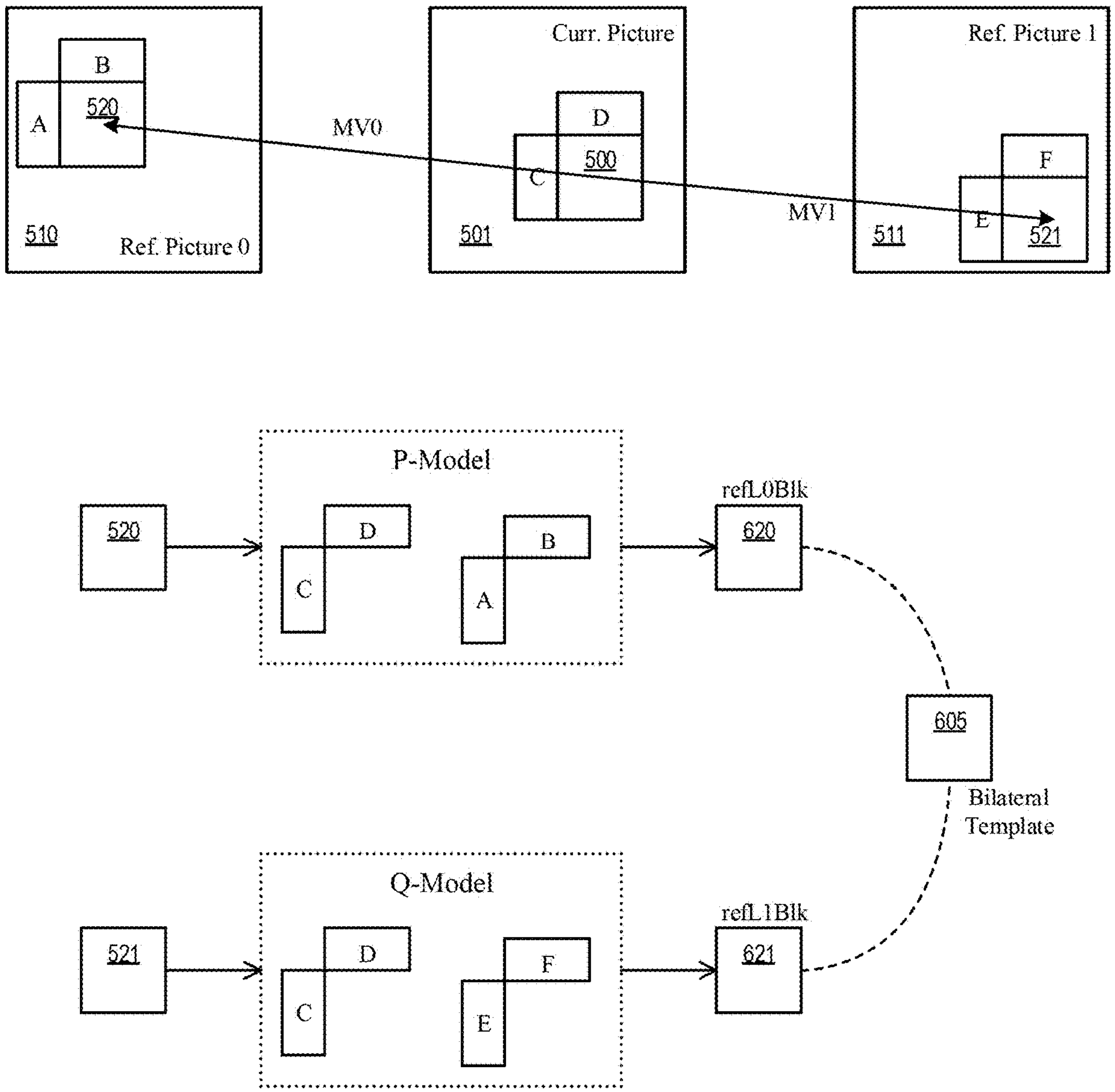
FIG. 6 conceptually illustrates generating a bilateral template based on reference blocks that are refined by linear models.

FIG. 6 conceptually illustrates generating a bilateral template based on reference blocks that are refined by linear models. As illustrated, extended regions A and B of the L0 reference block 520 and the extended regions C and D of the current block 500 are used to derive the P-model. Extended regions E and F of the L1 reference block 521 and the extended regions C and D of the current block 500 are used to derive the Q-model. The P-model is applied to refine the reference block 520 into a refined L0 reference block 620 (refL0Blk). The Q-model is applied to refine the reference block 521 into a refined L1 reference block 621 (refL1Blk). A bilateral template 605 is generated by weighted sum of the refined L0 and L1 reference blocks 620 and 621. The bilateral template 605 can be used by any bilateral template with DMVR methods described above.

In some embodiments, a bilateral template is generated by weighted sum of reference block of L0 and reference block of L1. The P-model is used to refine the bilateral template to generate bilTemplateP (L0 bilateral template) and the Q-model is used to refine the bilateral template to generate bilTemplateQ (L1 bilateral template) independently. The generated bilTemplateP and bilTemplateQ can be used for any bilateral template method mentioned in the above for refining reference list0 MV and reference list1 MV, respectively.

Figure 7:
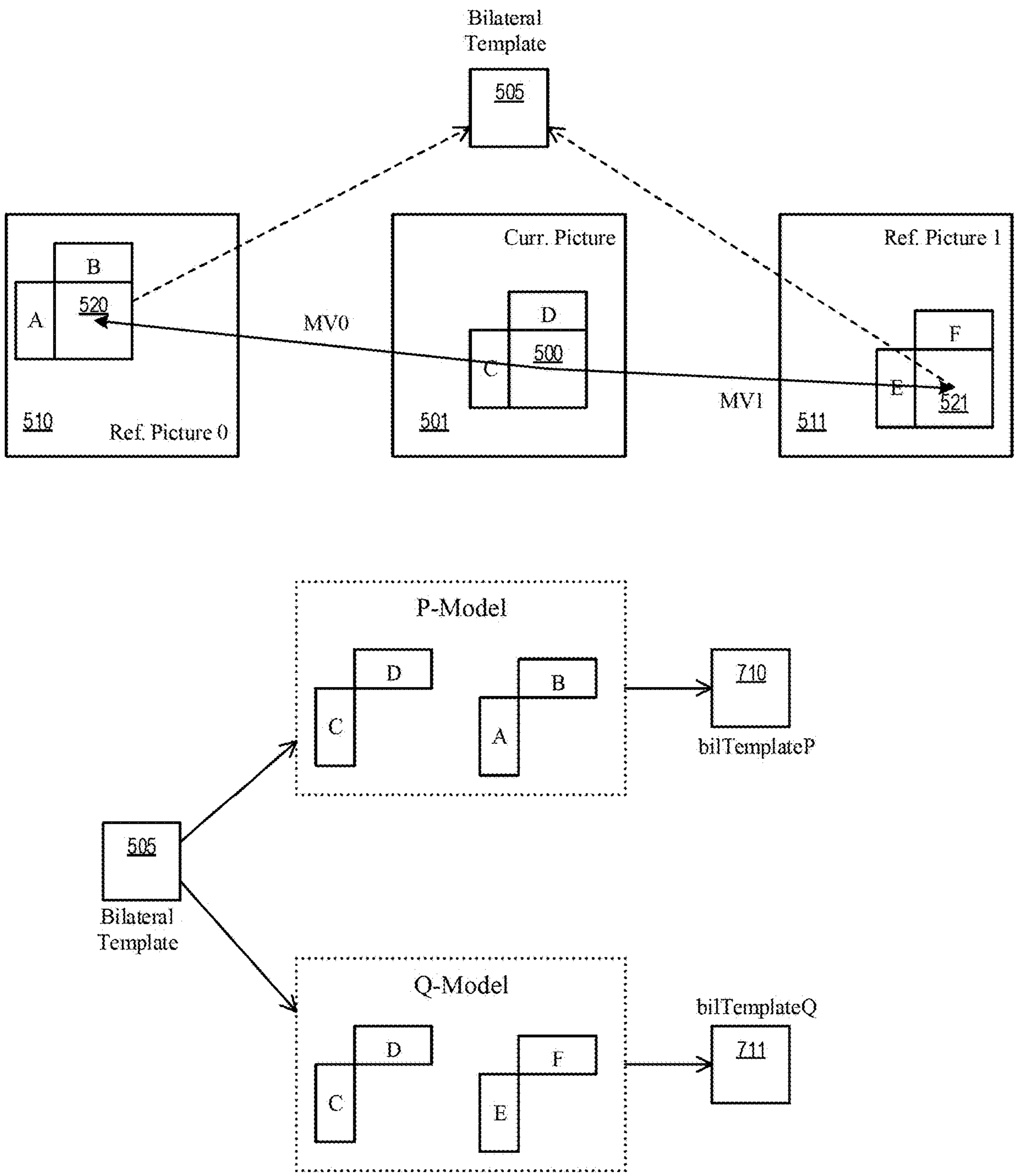
FIG. 7 conceptually illustrates using L0 and L1 linear models (P-model and Q-model) to refine the bilateral template into a L0 bilateral template and a L1 bilateral template.

FIG. 7 conceptually illustrates using L0 and L1 linear models (P-model and Q-model) to refine the bilateral template into a L0 bilateral template and a L1 bilateral template. As illustrated, the initial L0 reference block 520 (referred by MV0) and the initial L1 reference block 521 (referred by MV1) are used to create a bilateral template 505. The extended regions A and B of the L0 reference block 520 and the extended regions C and D of the current block 500 are used to derive the P-model. Extended regions E and F of the L1 reference block 521 and the extended regions C and D of the current block 500 are used to derive the Q-model. The P-model is applied to the bilateral template 505 to create a L0 bilateral template (bilTemplateP) 710 and the Q-model is applied to the bilateral template 505 to create a L1 bilateral template (bilTemplateQ) 711. The generated L0 bilateral template 710 and the generated L1 bilateral template 711 can be used for any bilateral template method mentioned in the above for refining reference list0 MV and reference list1 MV, respectively.

The linear models described above can be generated/derived in different ways. For example, in some embodiments, the parameters of a linear model may be derived based on the correlation between the reference samples and the current reconstructed samples. In some embodiments, the samples used to derive a linear model in i above lines and j left lines can be obtained by sub-sampling. In some embodiments, the number of samples used to derive a linear model are constrained to be power of 2. In some embodiments, the samples used to derive a linear model are constrained to be in the same CTU or the same CTU rows with current block. In some embodiments, if the number of samples used to derive a linear model is not larger than a pre-defined threshold, the template refinement will not be performed. The pre-defined threshold can be designed based on the current block size (e.g., if the current block size is 32×32, the threshold is 128; if current block size is 64×128, the threshold is 1024). In some embodiments, the template refinement will not be performed if the current block size is larger than a threshold.

F. Different Weighting Pairs

In some embodiments, bilateral template block is generated based on weighted sum of the L0 predictor (weighted by w0) and the L1 predictor (weighted by w1) according to the following:

$$(w0*l0_{predictor}+w1*l1_{predictor})\gg N,$$

$$N=\log_2(w0+w1)$$

or $$(w0*l0_{predictor}+w1*l1_{predictor}+\text{offset})\gg N,$$

$$N=\log_2(w0+w1),$$

$$\text{offset}=1\ll(N-1)$$

In some embodiments, the weights w0 and w1 are determined based on the slice quantization parameter (QP) value of the L0 and L1 predictors. If sliceQP of L0 is smaller than sliceQP of L1, w0 shall be larger than w1; otherwise, w1 shall be larger than w0.

In some embodiments, the formula of bi-template block generation can be designed based on the picture order count (POC) distance between the L0 predictor (or L0 reference picture) and the current picture, and the POC distance between L1 predictor (or L1 reference picture) and the current picture. The direction or side with smaller delta (difference of) POC distance shall use larger weight. In some embodiments, the weighting pair of bi-template block generation can be designed based on the BCW (bi-prediction with CU-level weights) index of the to-be refined merge candidate.

In some embodiments, more than one conditions can be used to determine the weighting pair of bi-template block of MP-DMVR. For example, if the delta POC of L0 is smaller than the delta POC of L1 and sliceQP of L0 is smaller than sliceQP of L1, w0 is set to be 10 (or M), and w1 is set to be −2. And if the delta POC of L0 is smaller than the delta POC of L1 or sliceQP of L0 is smaller than sliceQP of L1, w0 is set to be 5 (or N), and w1 is set to be 3 (M>N).

In some embodiments, the weighting pair of bi-template generation can be determined based on the template matching (TM) cost of L0 and L1. The neighboring M lines above of reference block of L0/L1 and the neighboring N lines on the left of reference block on L0/L1 are used to calculate TM cost of L0/L1. The value of M and N can be any integer larger than 0. The list with smaller TM cost can have larger weight.

In some embodiments, the weights may be determined based on the luminous compensation (LIC) parameter of the two lists (L0 and L1). The neighboring samples of current block and/or compensated block can be used to derive the LIC parameter. In one embodiment, the above-mentioned methods can be combined. The weight can be determined based on one or more conditions mentioned above.

In some embodiments, the sum of weighting pairs is constrained to be a power of 2 value. With this constraint, the value of bi-template block of MP-DMVR can be derived by a simple right shift. In some embodiments, the weighting pairs of bi-template of MP-DMVR shall be the subset of BCW (bi-prediction with CU-level weights) weighting pair.

Any of the foregoing proposed methods can be implemented in encoders and/or decoders. For example, any of the proposed methods can be implemented in DMVR module of an encoder and/or a decoder. Alternatively, any of the proposed methods can be implemented as a circuit coupled to DMVR module of the encoder and/or the decoder.

V. Example Video Encoder

Figure 8:
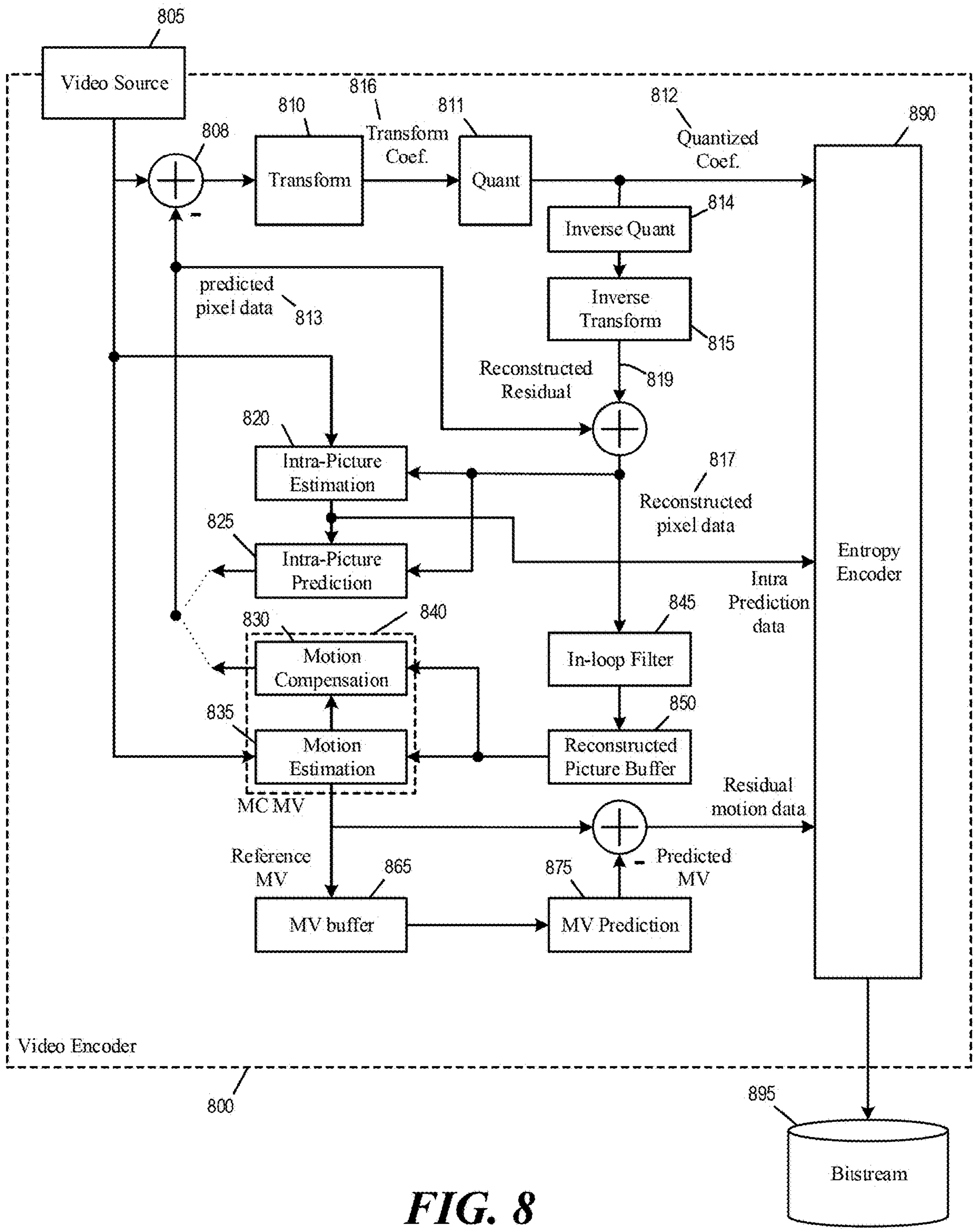
FIG. 8 illustrates an example video encoder that may implement MP-DMVR and bilateral template.

FIG. 8 illustrates an example video encoder 800 that may implement MP-DMVR and bilateral template. As illustrated, the video encoder 800 receives input video signal from a video source 805 and encodes the signal into bitstream 895. The video encoder 800 has several components or modules for encoding the signal from the video source 805, at least including some components selected from a transform module 810, a quantization module 811, an inverse quantization module 814, an inverse transform module 815, an intra-picture estimation module 820, an intra-prediction module 825, a motion compensation module 830, a motion estimation module 835, an in-loop filter 845, a reconstructed picture buffer 850, a MV buffer 865, and a MV prediction module 875, and an entropy encoder 890. The motion compensation module 830 and the motion estimation module 835 are part of an inter-prediction module 840.

In some embodiments, the modules 810-890 are modules of software instructions being executed by one or more processing units (e.g., a processor) of a computing device or electronic apparatus. In some embodiments, the modules 810-890 are modules of hardware circuits implemented by one or more integrated circuits (ICs) of an electronic apparatus. Though the modules 810-890 are illustrated as being separate modules, some of the modules can be combined into a single module.

The video source 805 provides a raw video signal that presents pixel data of each video frame without compression. A subtractor 808 computes the difference between the raw video pixel data of the video source 805 and the predicted pixel data 813 from the motion compensation module 830 or intra-prediction module 825. The transform module 810 converts the difference (or the residual pixel data or residual signal 808) into transform coefficients (e.g., by performing Discrete Cosine Transform, or DCT). The quantization module 811 quantizes the transform coefficients into quantized data (or quantized coefficients) 812, which is encoded into the bitstream 895 by the entropy encoder 890.

The inverse quantization module 814 de-quantizes the quantized data (or quantized coefficients) 812 to obtain transform coefficients, and the inverse transform module 815 performs inverse transform on the transform coefficients to produce reconstructed residual 819. The reconstructed residual 819 is added with the predicted pixel data 813 to produce reconstructed pixel data 817. In some embodiments, the reconstructed pixel data 817 is temporarily stored in a line buffer (not illustrated) for intra-picture prediction and spatial MV prediction. The reconstructed pixels are filtered by the in-loop filter 845 and stored in the reconstructed picture buffer 850. In some embodiments, the reconstructed picture buffer 850 is a storage external to the video encoder 800. In some embodiments, the reconstructed picture buffer 850 is a storage internal to the video encoder 800.

The intra-picture estimation module 820 performs intra-prediction based on the reconstructed pixel data 817 to produce intra prediction data. The intra-prediction data is provided to the entropy encoder 890 to be encoded into bitstream 895. The intra-prediction data is also used by the intra-prediction module 825 to produce the predicted pixel data 813.

The motion estimation module 835 performs inter-prediction by producing MVs to reference pixel data of previously decoded frames stored in the reconstructed picture buffer 850. These MVs are provided to the motion compensation module 830 to produce predicted pixel data.

Instead of encoding the complete actual MVs in the bitstream, the video encoder 800 uses MV prediction to generate predicted MVs, and the difference between the MVs used for motion compensation and the predicted MVs is encoded as residual motion data and stored in the bitstream 895.

The MV prediction module 875 generates the predicted MVs based on reference MVs that were generated for encoding previously video frames, i.e., the motion compensation MVs that were used to perform motion compensation. The MV prediction module 875 retrieves reference MVs from previous video frames from the MV buffer 865. The video encoder 800 stores the MVs generated for the current video frame in the MV buffer 865 as reference MVs for generating predicted MVs.

The MV prediction module 875 uses the reference MVs to create the predicted MVs. The predicted MVs can be computed by spatial MV prediction or temporal MV prediction. The difference between the predicted MVs and the motion compensation MVs (MC MVs) of the current frame (residual motion data) are encoded into the bitstream 895 by the entropy encoder 890.

The entropy encoder 890 encodes various parameters and data into the bitstream 895 by using entropy-coding techniques such as context-adaptive binary arithmetic coding (CABAC) or Huffman encoding. The entropy encoder 890 encodes various header elements, flags, along with the quantized transform coefficients 812, and the residual motion data as syntax elements into the bitstream 895. The bitstream 895 is in turn stored in a storage device or transmitted to a decoder over a communications medium such as a network.

The in-loop filter 845 performs filtering or smoothing operations on the reconstructed pixel data 817 to reduce the artifacts of coding, particularly at boundaries of pixel blocks. In some embodiments, the filtering operation performed includes sample adaptive offset (SAO). In some embodiment, the filtering operations include adaptive loop filter (ALF).

Figure 9:
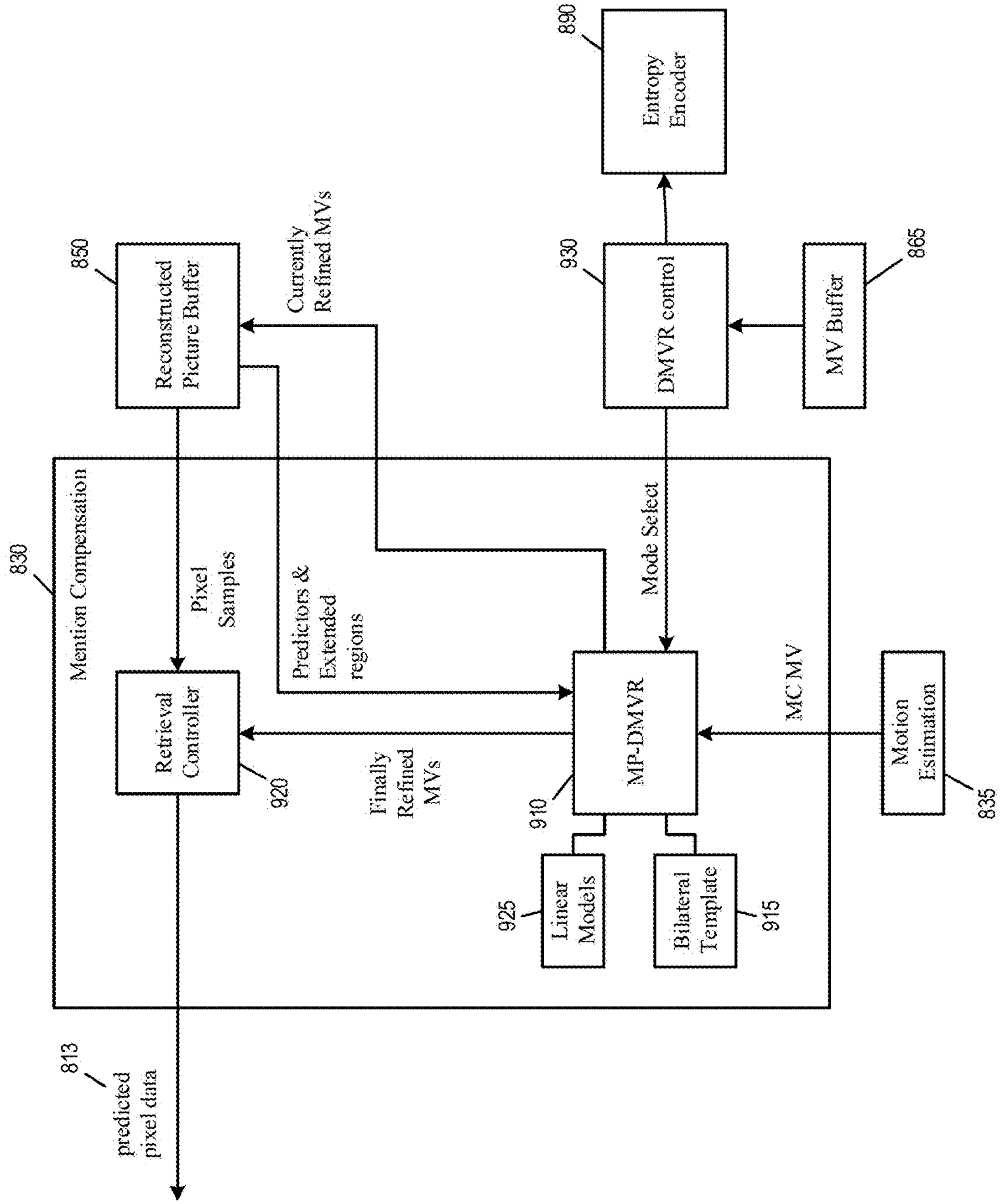
FIG. 9 illustrates portions of the video encoder that implement Bilateral Template MP-DMVR.

FIG. 9 illustrates portions of the video encoder 800 that implement Bilateral Template MP-DMVR. Specifically, the figure illustrates the components of the motion compensation module 830 of the video encoder 800. As illustrated, the motion compensation module 830 receives the motion compensation MV (MC MV) from the motion estimation module 835.

A MP-DMVR module 910 performs MP-DMVR process by using the MC MV as the initial or original MVs in L0 and/or L1 directions. The MP-DMVR module 910 refines the initial MVs into finally refined MVs in one or more refinement passes. The finally refined MVs is then used by a retrieval controller 920 to generate the predicted pixel data 813 based on content of the reconstructed picture buffer 850.

The MP-DMVR module 910 retrieves content of the reconstructed picture buffer 850. The content retrieved from the reconstructed picture buffer 850 includes predictors (or reference blocks) that are referred to by currently refined MVs (which may be the initial MVs, or any subsequent update). The retrieved content may also include extended regions of the current block and of the initial predictors. The MP-DMVR module 910 may use the retrieved content to calculate a bilateral template 915 and one or more linear models 925.

The MP-DMVR module 910 may use the retrieved predictors and the calculated bilateral template to calculate costs for refining motion vectors, as described above in Sections I-IV above. The MP-DMVR may also use the retrieved predictors to perform bilateral matching (BM) in some of the refinement passes. The MP-DMVR module 910 may also use the extended regions to calculate the linear models 925, and then use the calculated linear models to refine the bilateral template 915 or the predictors, as described above in e.g., Section IV-E.

A DMVR control module 930 may determine which mode that the MP-DMVR module 910 should operate in and provide such mode information to the entropy encoder 890 to be encoded as syntax elements (e.g., bm_merge_flag, bm_bi_template_flag, bm_dir_flag, bm_mode_index) in slice or picture or sequence level of the bitstream 895.

Figure 10:
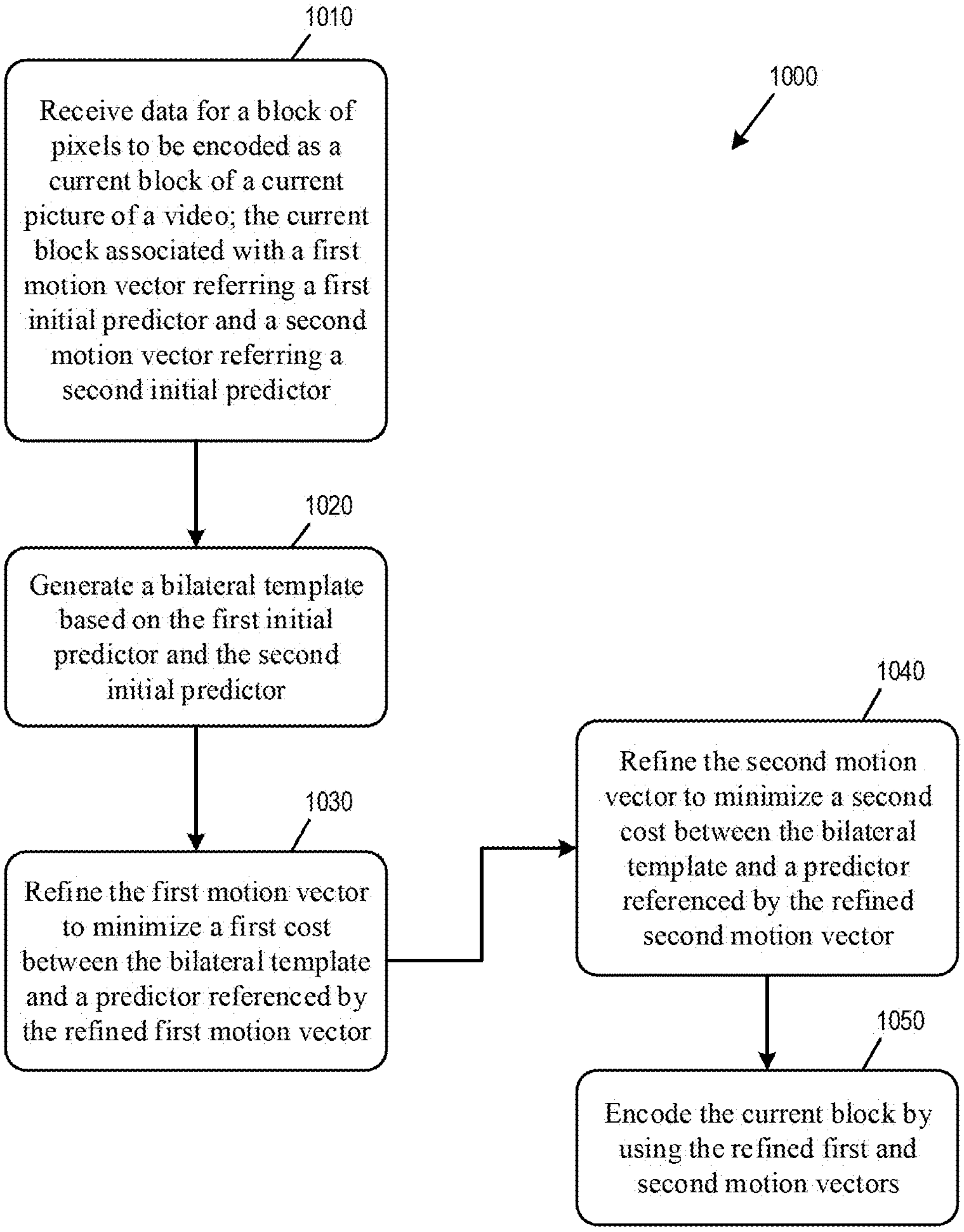
FIG. 10 conceptually illustrates a process for using bilateral template with MP-DMVR.

FIG. 10 conceptually illustrates a process 1000 for using bilateral template with MP-DMVR. In some embodiments, one or more processing units (e.g., a processor) of a computing device implementing the encoder 800 performs the process 1000 by executing instructions stored in a computer readable medium. In some embodiments, an electronic apparatus implementing the encoder 800 performs the process 1000.

The encoder receives (at block 1010) data to be encoded as a current block of pixels in a current picture of a video. The current block is associated with a first motion vector that reference a first initial predictor in a first reference picture and a second motion vector that reference a second initial predictor in a second reference picture. The first and second motion vectors may be of a bi-prediction merge candidate. When the first motion vector is a uni-prediction candidate, the second motion vector may be generated by mirroring the first motion vector in an opposite direction.

In some embodiments, the video encoder also signals a first syntax element (e.g., bm_bi_template_flag) that indicates whether to refine the first or second motion vectors by using the generated bilateral template or by performing bilateral matching based on the first and second initial predictors. In some embodiments, the video encoder signals a second syntax element (e.g., bm_dir_flag, bm_index) that indicates whether to refine the first motion vector or to refine the second motion vector.

The encoder generates (at block 1020) a bilateral template based on the first initial predictor and the second initial predictor. The encoder may derive the bilateral template as a weighted sum of the first initial predictor and the second initial predictor. In some embodiments, the weights respectively applied to the first and second initial predictors are determined based on slice quantization parameter values of the first and second initial predictors. In some embodiments, the weights respectively applied to the first and second initial predictors are determined based on picture order count (POC) distances of the first and second reference pictures from the current picture. In some embodiments, the weights respectively applied to the first and second initial predictors are determined according to a Bi-prediction with CU-level weights (BCW) index that is signaled for the current block.

In some embodiments, the video encoder refines the bilateral template by using a linear model that is generated based on extended regions (e.g., L-shaped above and left regions) of the first initial predictor, the second initial predictor, and the current block. In some embodiments, the video encoder refines the first and second initial predictors based on a linear model that is generated based on extended regions of the first initial predictor, the second initial predictor, and the current block, then generates the bilateral template based on the refined first and second initial predictors. The derivation and use of linear models for DMVR is described in e.g., Section IV-E above.

The encoder refines (at block 1030) the first motion vector to minimize a first cost between the bilateral template and a predictor referenced by the refined first motion vector. The encoder refines (at block 1040) the second motion vector to minimize a second cost between the bilateral template and a predictor referenced by the refined second motion vector.

In some embodiments, the video encoder performs the operations at blocks 1030 and 1040 to refine the first and second motion vectors as a first refinement pass. The video encoder may further refine the first and second motion vectors for each sub-block of a plurality of sub-blocks of the current block in a second refinement pass. The video encoder may further refine the first and second motion vectors by applying bi-directional optical flow (BDOF) in a third refinement pass. In some embodiments, during the second refinement pass, the first and second motion vectors are refined by minimizing a cost between a predictor referenced by the refined first motion vector and a predictor referenced by the refined second motion vector (i.e., bilateral matching.) In some embodiments, when the bilateral template is used to refine the first and second motion vectors, second and third refinement passes are disabled.

The encoder encodes (at block 1050) the current block by using the refined first and second motion vectors to produce prediction residuals and to reconstruct the current block.

VI. Example Video Decoder

In some embodiments, an encoder may signal (or generate) one or more syntax element in a bitstream, such that a decoder may parse said one or more syntax element from the bitstream.

Figure 11:
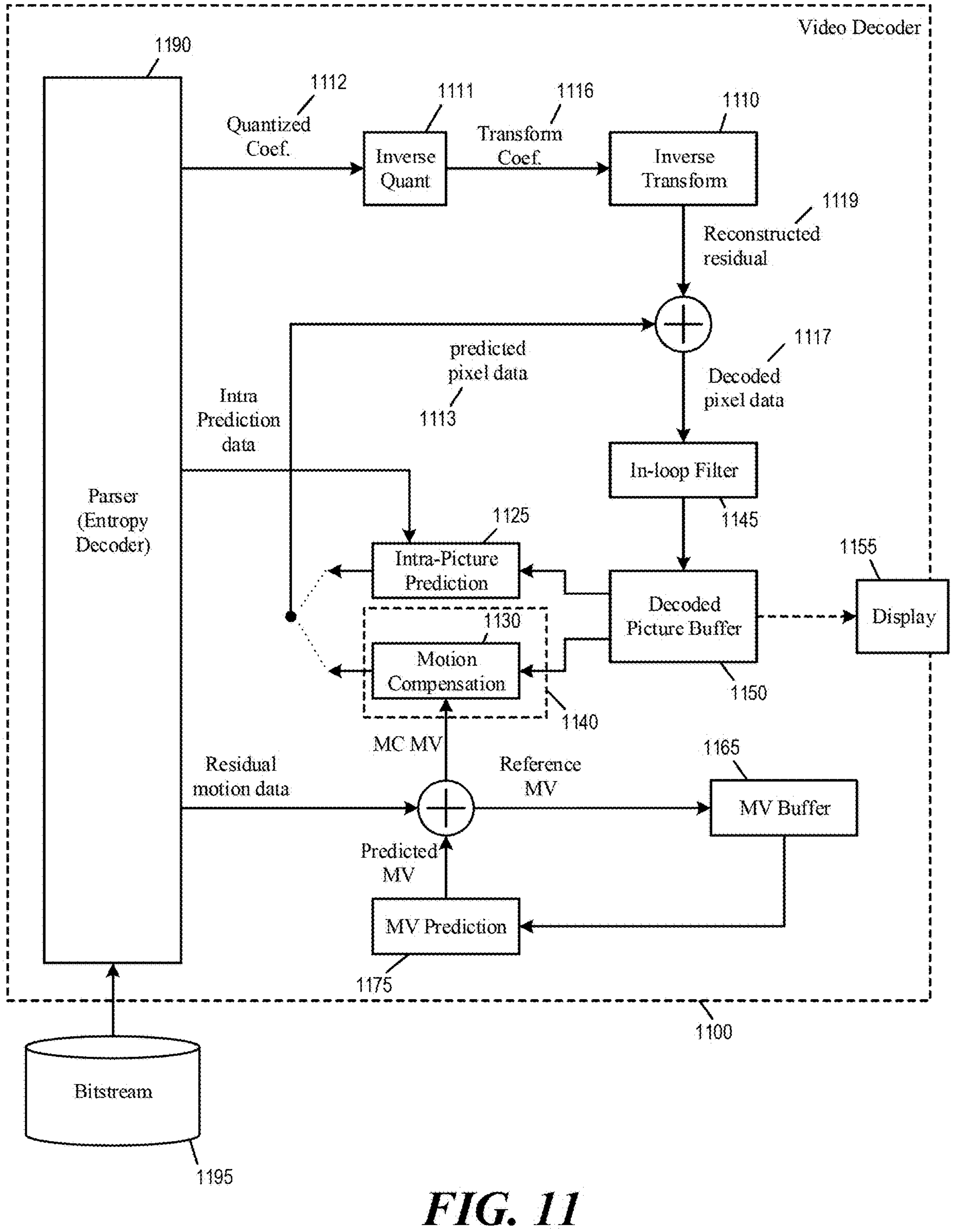
FIG. 11 illustrates an example video decoder that may implement MP-DMVR and bilateral template.

FIG. 11 illustrates an example video decoder 1100 that may implement MP-DMVR and bilateral template. As illustrated, the video decoder 1100 is an image-decoding or video-decoding circuit that receives a bitstream 1195 and decodes the content of the bitstream into pixel data of video frames for display. The video decoder 1100 has several components or modules for decoding the bitstream 1195, including some components selected from an inverse quantization module 1111, an inverse transform module 1110, an intra-prediction module 1125, a motion compensation module 1130, an in-loop filter 1145, a decoded picture buffer 1150, a MV buffer 1165, a MV prediction module 1175, and a parser 1190. The motion compensation module 1130 is part of an inter-prediction module 1140.

In some embodiments, the modules 1110-1190 are modules of software instructions being executed by one or more processing units (e.g., a processor) of a computing device. In some embodiments, the modules 1110-1190 are modules of hardware circuits implemented by one or more ICs of an electronic apparatus. Though the modules 1110-1190 are illustrated as being separate modules, some of the modules can be combined into a single module.

The parser 1190 (or entropy decoder) receives the bitstream 1195 and performs initial parsing according to the syntax defined by a video-coding or image-coding standard. The parsed syntax element includes various header elements, flags, as well as quantized data (or quantized coefficients) 1112. The parser 1190 parses out the various syntax elements by using entropy-coding techniques such as context-adaptive binary arithmetic coding (CABAC) or Huffman encoding.

The inverse quantization module 1111 de-quantizes the quantized data (or quantized coefficients) 1112 to obtain transform coefficients, and the inverse transform module 1110 performs inverse transform on the transform coefficients 1116 to produce reconstructed residual signal 1119. The reconstructed residual signal 1119 is added with predicted pixel data 1113 from the intra-prediction module 1125 or the motion compensation module 1130 to produce decoded pixel data 1117. The decoded pixels data are filtered by the in-loop filter 1145 and stored in the decoded picture buffer 1150. In some embodiments, the decoded picture buffer 1150 is a storage external to the video decoder 1100. In some embodiments, the decoded picture buffer 1150 is a storage internal to the video decoder 1100.

The intra-prediction module 1125 receives intra-prediction data from bitstream 1195 and according to which, produces the predicted pixel data 1113 from the decoded pixel data 1117 stored in the decoded picture buffer 1150. In some embodiments, the decoded pixel data 1117 is also stored in a line buffer (not illustrated) for intra-picture prediction and spatial MV prediction.

In some embodiments, the content of the decoded picture buffer 1150 is used for display. A display device 1155 either retrieves the content of the decoded picture buffer 1150 for display directly, or retrieves the content of the decoded picture buffer to a display buffer. In some embodiments, the display device receives pixel values from the decoded picture buffer 1150 through a pixel transport.

The motion compensation module 1130 produces predicted pixel data 1113 from the decoded pixel data 1117 stored in the decoded picture buffer 1150 according to motion compensation MVs (MC MVs). These motion compensation MVs are decoded by adding the residual motion data received from the bitstream 1195 with predicted MVs received from the MV prediction module 1175.

The MV prediction module 1175 generates the predicted MVs based on reference MVs that were generated for decoding previous video frames, e.g., the motion compensation MVs that were used to perform motion compensation. The MV prediction module 1175 retrieves the reference MVs of previous video frames from the MV buffer 1165. The video decoder 1100 stores the motion compensation MVs generated for decoding the current video frame in the MV buffer 1165 as reference MVs for producing predicted MVs.

The in-loop filter 1145 performs filtering or smoothing operations on the decoded pixel data 1117 to reduce the artifacts of coding, particularly at boundaries of pixel blocks. In some embodiments, the filtering operation performed includes sample adaptive offset (SAO). In some embodiment, the filtering operations include adaptive loop filter (ALF).

Figure 12:
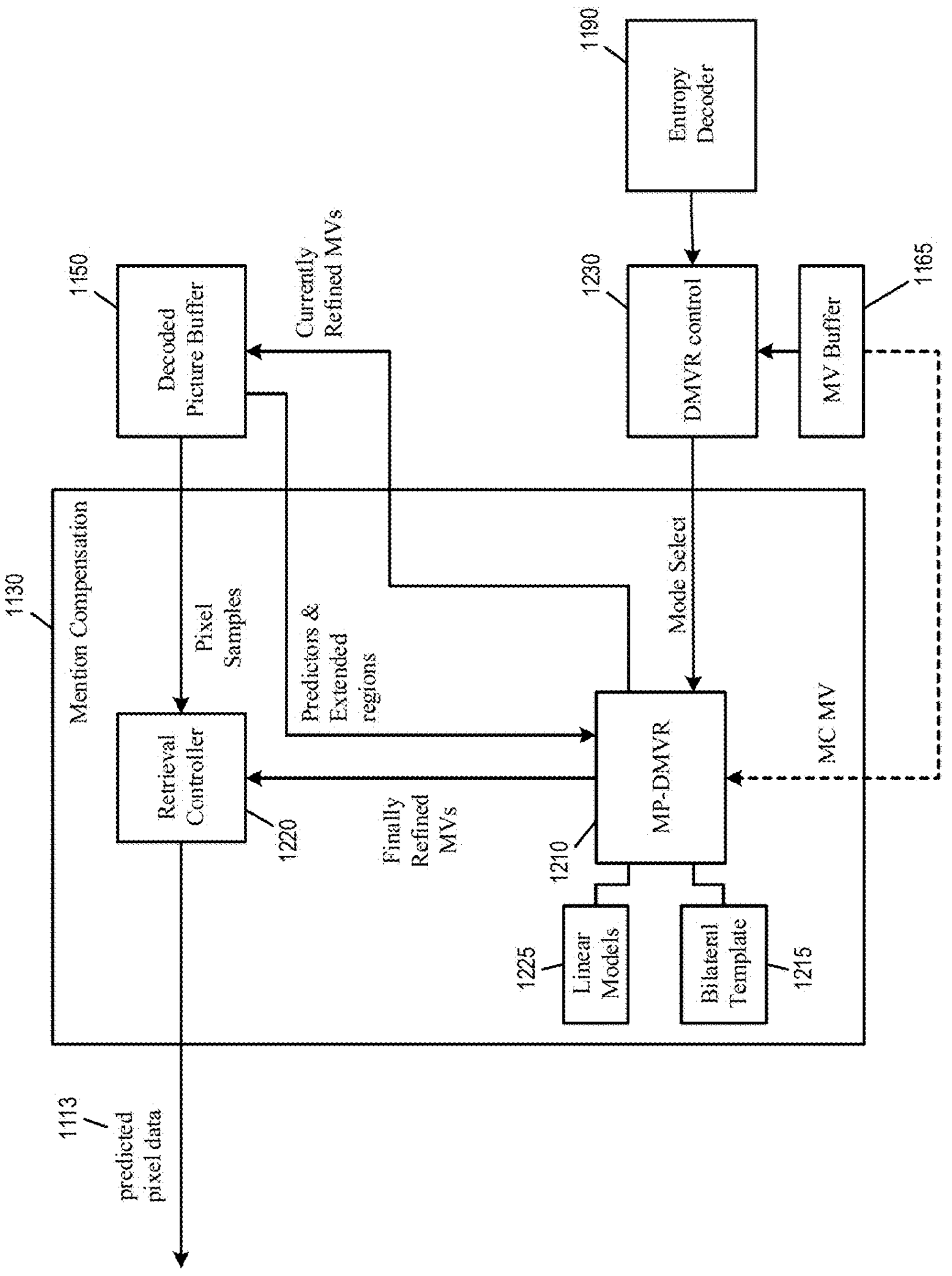
FIG. 12 illustrates portions of the video decoder that implement Bilateral Template MP-DMVR.

FIG. 12 illustrates portions of the video decoder 1100 that implement Bilateral Template MP-DMVR. Specifically, the figure illustrates the components of the motion compensation module 1130 of the video decoder 1100. As illustrated, the motion compensation module 1130 receives the motion compensation MV (MC MV) from the entropy decoder 1190 or the MV buffer 1165.

A MP-DMVR module 1210 performs MP-DMVR process by using the MC MV as the initial or original MVs in L0 and/or L1 directions. The MP-DMVR module 1210 refines the initial MVs into finally refined MVs in one or more refinement passes. The finally refined MVs is then used by a retrieval controller 1220 to generate the predicted pixel data 1113 based on content of the decoded picture buffer 1150.

The MP-DMVR module 1210 retrieves content of the decoded picture buffer 1150. The content retrieved from the decoded picture buffer 1150 includes predictors (or reference blocks) that are referred to by currently refined MVs (which may be the initial MVs, or any subsequent update). The retrieved content may also include extended regions of the current block and of the initial predictors. The MP-DMVR module 1210 may use the retrieved content to calculate a bilateral template 1215 and one or more linear models 1225.

The MP-DMVR module 1210 may use the retrieved predictors and the calculated bilateral template to calculate costs for refining motion vectors, as described above in Sections I-IV above. The MP-DMVR may also use the retrieved predictors to perform bilateral matching (BM) in some of the refinement passes. The MP-DMVR module 1210 may also use the extended regions to calculate the linear models 1225, and then use the calculated linear models to refine the bilateral template 1215 or the predictors, as described above in e.g., Section IV-E.

A DMVR control module 1230 may determine which mode that the MP-DMVR module 1210 should operate in. The DMVR control module 1230 may determine such modes based on information provided by the entropy decoder 1190, which may parse the bitstream 1195 in slice or picture or sequence levels for relevant syntax elements (e.g., bm_merge_flag, bm_bi_template_flag, bm_dir_flag, bm_mode_index.)

Figure 13:
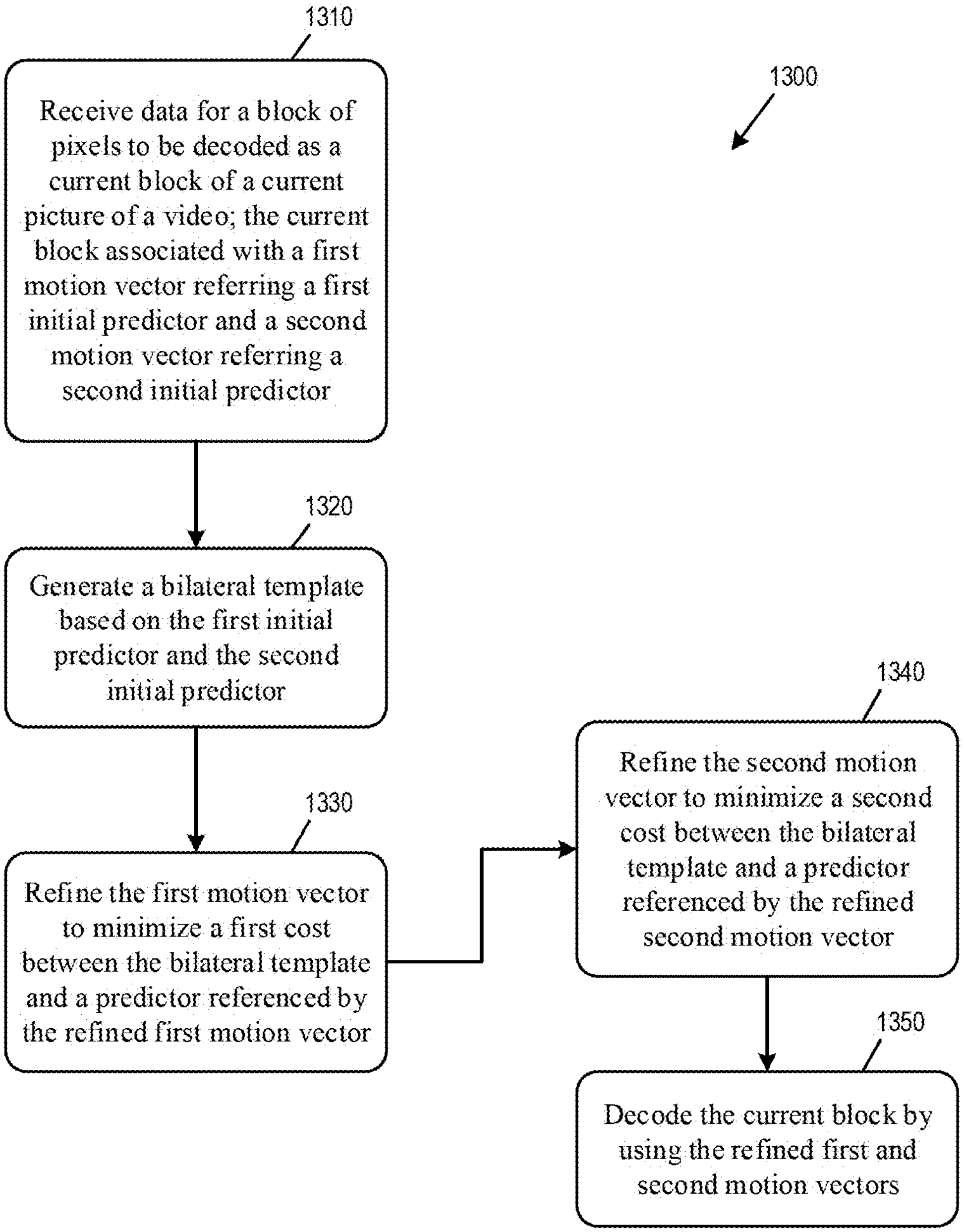
FIG. 13 conceptually illustrates a process for using bilateral template with MP-DMVR.

FIG. 13 conceptually illustrates a process 1300 for using bilateral template with MP-DMVR. In some embodiments, one or more processing units (e.g., a processor) of a computing device implementing the decoder 1100 performs the process 1300 by executing instructions stored in a computer readable medium. In some embodiments, an electronic apparatus implementing the decoder 1100 performs the process 1300.

The decoder receives (at block 1310) data to be decoded as a current block of pixels in a current picture of a video. The current block is associated with a first motion vector that reference a first initial predictor in a first reference picture and a second motion vector that reference a second initial predictor in a second reference picture. The first and second motion vectors may be of a bi-prediction merge candidate. When the first motion vector is a uni-prediction candidate, the second motion vector may be generated by mirroring the first motion vector in an opposite direction.

In some embodiments, the video decoder also receives a first syntax element (e.g., bm_bi_template_flag) that indicates whether to refine the first or second motion vectors by using the generated bilateral template or by performing bilateral matching based on the first and second initial predictors. In some embodiments, the video decoder receives a second syntax element (e.g., bm_dir_flag, bm_index) that indicates whether to refine the first motion vector or to refine the second motion vector.

The decoder generates (at block 1320) a bilateral template based on the first initial predictor and the second initial predictor. The decoder may derive the bilateral template as a weighted sum of the first initial predictor and the second initial predictor. In some embodiments, the weights respectively applied to the first and second initial predictors are determined based on slice quantization parameter values of the first and second initial predictors. In some embodiments, the weights respectively applied to the first and second initial predictors are determined based on picture order count (POC) distances of the first and second reference pictures from the current picture. In some embodiments, the weights respectively applied to the first and second initial predictors are determined according to a Bi-prediction with CU-level weights (BCW) index that is signaled for the current block.

In some embodiments, the video decoder refines the bilateral template by using a linear model that is generated based on extended regions (e.g., L-shaped above and left regions) of the first initial predictor, the second initial predictor, and the current block. In some embodiments, the video decoder refines the first and second initial predictors based on a linear model that is generated based on extended regions of the first initial predictor, the second initial predictor, and the current block, then generates the bilateral template based on the refined first and second initial predictors. The derivation and use of linear models for DMVR is described in e.g., Section IV-E above.

The decoder refines (at block 1330) the first motion vector to minimize a first cost between the bilateral template and a predictor referenced by the refined first motion vector. The decoder refines (at block 1340) the second motion vector to minimize a second cost between the bilateral template and a predictor referenced by the refined second motion vector.

In some embodiments, the video decoder performs the operations at blocks 1330 and 1340 to refine the first and second motion vectors as a first refinement pass. The video decoder may further refine the first and second motion vectors for each sub-block of a plurality of sub-blocks of the current block in a second refinement pass. The video decoder may further refine the first and second motion vectors by applying bi-directional optical flow (BDOF) in a third refinement pass. In some embodiments, during the second refinement pass, the first and second motion vectors are refined by minimizing a cost between a predictor referenced by the refined first motion vector and a predictor referenced by the refined second motion vector (i.e., bilateral matching.) In some embodiments, when the bilateral template is used to refine the first and second motion vectors, the second and third refinement passes are disabled.

The decoder decodes (at block 1350) the current block by using the refined first and second motion vectors to produce prediction residuals and to reconstruct the current block. The decoder may then provide the reconstructed current block for display as part of the reconstructed current picture.

VII. Example Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random-access memory (RAM) chips, hard drives, erasable programmable read only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the present disclosure. In some embodiments, the software programs, when installed to operate on one or more electronic systems, define one or more specific machine implementations that execute and perform the operations of the software programs.

Figure 14:
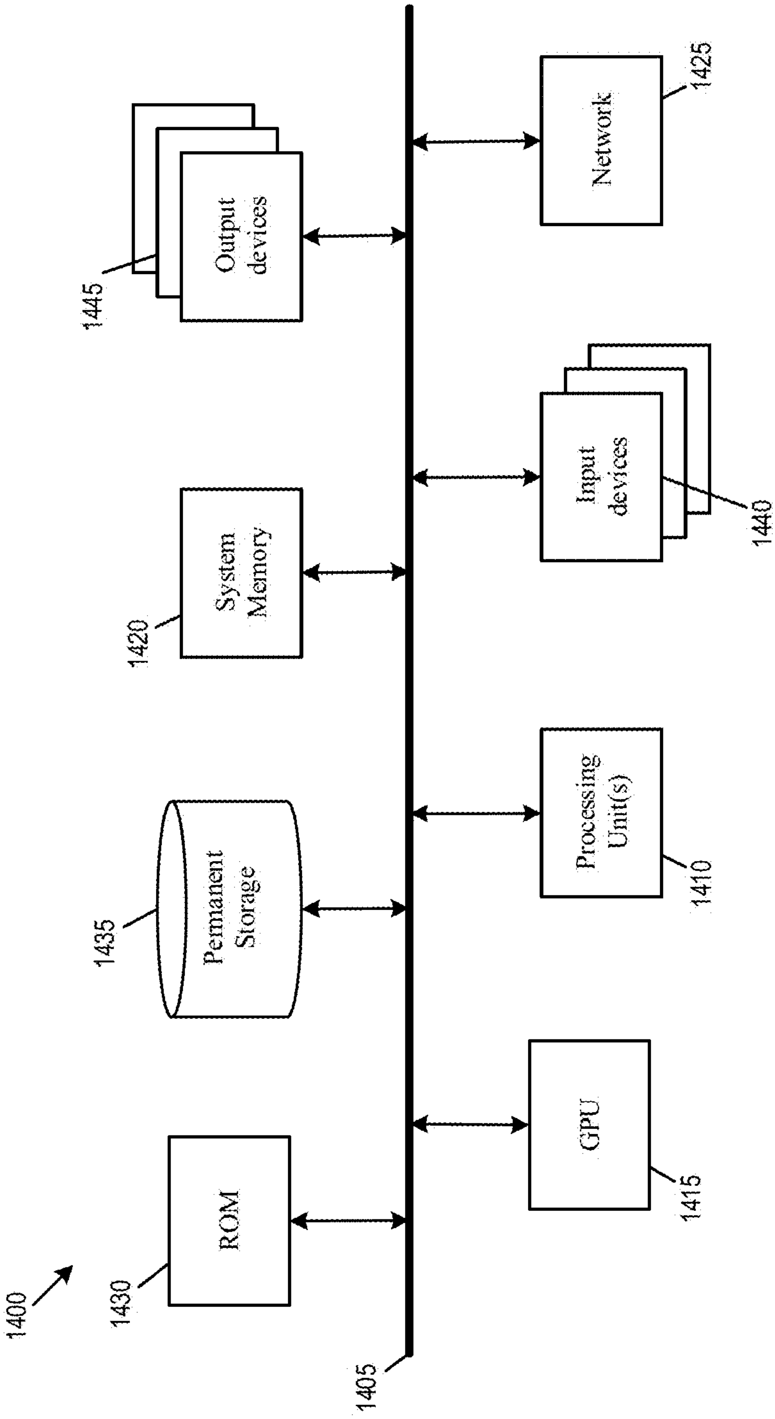
FIG. 14 conceptually illustrates an electronic system with which some embodiments of the present disclosure are implemented.

FIG. 14 conceptually illustrates an electronic system 1400 with which some embodiments of the present disclosure are implemented. The electronic system 1400 may be a computer (e.g., a desktop computer, personal computer, tablet computer, etc.), phone, PDA, or any other sort of electronic device. Such an electronic system includes various types of computer readable media and interfaces for various other types of computer readable media. Electronic system 1400 includes a bus 1405, processing unit(s) 1410, a graphics-processing unit (GPU) 1415, a system memory 1420, a network 1425, a read-only memory 1430, a permanent storage device 1435, input devices 1440, and output devices 1445.

The bus 1405 collectively represents all system, peripheral, and chipset buses that communicatively connect the numerous internal devices of the electronic system 1400. For instance, the bus 1405 communicatively connects the processing unit(s) 1410 with the GPU 1415, the read-only memory 1430, the system memory 1420, and the permanent storage device 1435.

From these various memory units, the processing unit(s) 1410 retrieves instructions to execute and data to process in order to execute the processes of the present disclosure. The processing unit(s) may be a single processor or a multi-core processor in different embodiments. Some instructions are passed to and executed by the GPU 1415. The GPU 1415 can offload various computations or complement the image processing provided by the processing unit(s) 1410.

The read-only-memory (ROM) 1430 stores static data and instructions that are used by the processing unit(s) 1410 and other modules of the electronic system. The permanent storage device 1435, on the other hand, is a read-and-write memory device. This device is a non-volatile memory unit that stores instructions and data even when the electronic system 1400 is off. Some embodiments of the present disclosure use a mass-storage device (such as a magnetic or optical disk and its corresponding disk drive) as the permanent storage device 1435.

Other embodiments use a removable storage device (such as a floppy disk, flash memory device, etc., and its corresponding disk drive) as the permanent storage device. Like the permanent storage device 1435, the system memory 1420 is a read-and-write memory device. However, unlike storage device 1435, the system memory 1420 is a volatile read-and-write memory, such a random access memory. The system memory 1420 stores some of the instructions and data that the processor uses at runtime. In some embodiments, processes in accordance with the present disclosure are stored in the system memory 1420, the permanent storage device 1435, and/or the read-only memory 1430. For example, the various memory units include instructions for processing multimedia clips in accordance with some embodiments. From these various memory units, the processing unit(s) 1410 retrieves instructions to execute and data to process in order to execute the processes of some embodiments.

The bus 1405 also connects to the input and output devices 1440 and 1445. The input devices 1440 enable the user to communicate information and select commands to the electronic system. The input devices 1440 include alphanumeric keyboards and pointing devices (also called "cursor control devices"), cameras (e.g., webcams), microphones or similar devices for receiving voice commands, etc. The output devices 1445 display images generated by the electronic system or otherwise output data. The output devices 1445 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 14, bus 1405 also couples electronic system 1400 to a network 1425 through a network adapter (not shown). In this manner, the computer can be a part of a network of computers (such as a local area network ("LAN"), a wide area network ("WAN"), or an Intranet, or a network of networks, such as the Internet. Any or all components of electronic system 1400 may be used in conjunction with the present disclosure.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, many of the above-described features and applications are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the present disclosure has been described with reference to numerous specific details, one of ordinary skill in the art will recognize that the present disclosure can be embodied in other specific forms without departing from the spirit of the present disclosure. In addition, a number of the figures (including FIG. 10 and FIG. 13) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the present disclosure is not to be limited by the foregoing illustrative details, but rather is to be defined by the appended claims.

ADDITIONAL NOTES

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A video coding method comprising:

receiving data for a block of pixels to be encoded or decoded as a current block of a current picture of a video, the current block associated with a first motion vector referring a first initial predictor in a first reference picture and a second motion vector referring a second initial predictor in a second reference picture;

generating a bilateral template based on the first initial predictor and the second initial predictor;

receiving or signaling one or more syntax elements that indicate (i) whether to refine the first or second motion vectors by using the bilateral template or by performing bilateral matching based on the first and second initial predictors and (ii) whether to refine the first motion vector or to refine the second motion vector;

refining the first motion vector to minimize a first cost between the bilateral template and a predictor referenced by the refined first motion vector;

refining the second motion vector to minimize a second cost between the bilateral template and a predictor referenced by the refined second motion vector; and encoding or decoding the current block by using the refined first and second motion vectors to reconstruct the current block.

2. The video coding method of claim 1, wherein the first and second motion vectors are refined in a first refinement pass, the method further comprising refining the first and second motion vectors for each sub-block of a plurality of sub-blocks of the current block in a second refinement pass.

3. The video coding method of claim 2, further comprising refining the first and second motion vectors by applying bi-directional optical flow (BDOF) in a third refinement pass.

4. The video coding method of claim 2, wherein during the second refinement pass, the first and second motion vectors are refined by minimizing a cost between a predictor referenced by the refined first motion vector and a predictor referenced by the refined second motion vector.

5. The video coding method of claim 1, wherein bilateral template is derived based on a weighted sum of the first initial predictor and the second initial predictor.

6. The video coding method of claim 5, wherein weights respectively applied to the first and second initial predictors are determined based on slice quantization parameter values of the first and second initial predictors.

7. The video coding method of claim 5, wherein the weights respectively applied to the first and second initial predictors are determined based on picture order count (POC) distances of the first and second reference pictures from the current picture.

8. The video coding method of claim 5, wherein the weights respectively applied to the first and second initial predictors are determined according to a Bi-prediction with CU-level weights (BCW) index that is used for the current block.

9. The video coding method of claim 1, further comprising refining the bilateral template by using a linear model that is generated based on extended regions of the first initial predictor, the second initial predictor, and the current block.

10. The video coding method of claim 1, further comprising refining the first and second initial predictors based on a linear model that is generated based on extended regions of the first initial predictor, the second initial predictor, and the current block, wherein the bilateral template is generated based on the refined first and second initial predictors.

11. The video coding method of claim 1, wherein the second motion vector is generated by mirroring the first motion vector in an opposite direction, the first motion vector being a uni-prediction candidate.

12. An electronic apparatus comprising:

a video coder circuit configured to perform operations comprising:

receiving data for a block of pixels to be encoded or decoded as a current block of a current picture of a video, the current block associated with a first motion vector referring a first initial predictor in a first reference picture and a second motion vector referring a second initial predictor in a second reference picture;

generating a bilateral template based on the first initial predictor and the second initial predictor;

receiving or signaling one or more syntax elements that indicate (i) whether to refine the first or second motion vectors by using the bilateral template or by performing bilateral matching based on the first and second initial predictors and (ii) whether to refine the first motion vector or to refine the second motion vector;

refining the first motion vector to minimize a first cost between the bilateral template and a predictor referenced by the refined first motion vector;

refining the second motion vector to minimize a second cost between the bilateral template and a predictor referenced by the refined second motion vector; and encoding or decoding the current block by using the refined first and second motion vectors to reconstruct the current block.

13. A video encoding method comprising:

receiving data for a block of pixels to be encoded as a current block of a current picture of a video, the current block associated with a first motion vector referring a first initial predictor in a first reference picture and a second motion vector referring a second initial predictor in a second reference picture;

generating a bilateral template based on the first initial predictor and the second initial predictor;

receiving or signaling one or more syntax elements that indicate (i) whether to refine the first or second motion vectors by using the bilateral template or by performing bilateral matching based on the first and second initial predictors and (ii) whether to refine the first motion vector or to refine the second motion vector;

refining the first motion vector to minimize a first cost between the bilateral template and a predictor referenced by the refined first motion vector;

refining the second motion vector to minimize a second cost between the bilateral template and a predictor referenced by the refined second motion vector; and encoding the current block by using the refined first and second motion vectors to reconstruct the current block.

* * * * *